United States Patent
Naruse et al.

(10) Patent No.: US 9,489,719 B2
(45) Date of Patent: Nov. 8, 2016

(54) IMAGE PROCESSING DEVICE, IMAGING DEVICE, COMPUTER, IMAGE PROCESSING METHOD AND COMPUTER READABLE NON-TRANSITORY MEDIUM

(71) Applicant: FUJIFILM CORPORATION, Tokyo (JP)

(72) Inventors: Yousuke Naruse, Saitama (JP); Kenkichi Hayashi, Saitama (JP); Hiroshi Endo, Saitama (JP); Kousuke Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/668,256

(22) Filed: Mar. 25, 2015

(65) Prior Publication Data
US 2015/0199795 A1 Jul. 16, 2015

Related U.S. Application Data

(63) Continuation of application No. PCT/JP2013/062001, filed on Apr. 24, 2013.

(30) Foreign Application Priority Data

Sep. 26, 2012 (JP) ................................ 2012-212243
Mar. 1, 2013 (JP) ................................ 2013-040681

(51) Int. Cl.
*G06K 9/40* (2006.01)
*G06T 5/00* (2006.01)
(Continued)

(52) U.S. Cl.
CPC ............... *G06T 5/001* (2013.01); *G06T 5/003* (2013.01); *G06T 5/10* (2013.01); *H04N 5/217* (2013.01); *H04N 5/23209* (2013.01)

(58) Field of Classification Search
CPC ......... G06T 5/001; G06T 5/003; G06T 5/20; G06T 5/002; G06T 5/10; G03B 35/08

USPC .......................................................... 382/260
See application file for complete search history.

(56) References Cited

U.S. PATENT DOCUMENTS

2003/0063815 A1   4/2003  Watanabe
2009/0279189 A1   11/2009 Getman et al.
(Continued)

FOREIGN PATENT DOCUMENTS

JP   4-101282 A     4/1992
JP   2003-172873 A  6/2003
(Continued)

OTHER PUBLICATIONS

International Preliminary Report on Patentability issued in PCT/JP2013/062001, dated Dec. 3, 2013.
(Continued)

*Primary Examiner* — Ali Bayat
(74) *Attorney, Agent, or Firm* — Birch, Stewart, Kolasch & Birch, LLP

(57) ABSTRACT

An image processing device includes a statistical information acquiring unit, an optical information acquiring unit, a filter information calculating unit and a filter coefficient calculating unit. The filter information calculating unit obtains filter information of a restoration filter for point image restoration processing according to at least one of statistical information and optical information. The filter information includes information related to number of taps of the restoration filter and information indicating a kind of symmetry of the restoration filter. The filter coefficient calculating unit calculates a filter coefficient of the restoration filter according to the statistical information and the optical information with at least the information related to the number of taps of the restoration filter and the information indicating the kind of the symmetry of the restoration filter of the filter information as a constraint condition.

22 Claims, 16 Drawing Sheets

(51) Int. Cl.
*H04N 5/217* (2011.01)
*G06T 5/10* (2006.01)
*H04N 5/232* (2006.01)

(56) References Cited

U.S. PATENT DOCUMENTS

| | | | |
|---|---|---|---|
| 2011/0135213 A1* | 6/2011 | Hatakeyama | G06T 5/003 382/254 |
| 2011/0135216 A1* | 6/2011 | Hatakeyama | G06T 5/003 382/260 |
| 2011/0242373 A1 | 10/2011 | Inoue et al. | |
| 2012/0002085 A1 | 1/2012 | Sekine | |
| 2012/0050583 A1* | 3/2012 | Watanabe | G06T 5/003 348/241 |
| 2012/0062760 A1* | 3/2012 | Klapp | G02B 26/06 348/222.1 |
| 2012/0075502 A1 | 3/2012 | Watanabe | |
| 2012/0154626 A1 | 6/2012 | Hatakeyama et al. | |
| 2013/0010086 A1* | 1/2013 | Iwasaki | G03B 35/08 348/49 |

FOREIGN PATENT DOCUMENTS

| | | |
|---|---|---|
| JP | 2009-271537 A | 11/2009 |
| JP | 2011-215707 A | 10/2011 |
| JP | 2012-015865 A | 1/2012 |
| JP | 2012-073691 A | 4/2012 |
| JP | 2012-129932 A | 7/2012 |

OTHER PUBLICATIONS

International Search Report issued in PCT/JP2013/062001, mailed on May 28, 2013.
Written Opinion issued in PCT/JP2013/062001, mailed on May 28, 2013.

* cited by examiner

FIG.5

| IDENTIFIER p (FILTER INFORMATION ID) | PSF SYMMETRY | PHASE | FILTER COEFFICIENT ARRANGEMENT FORMAT (M × M) | NUMBER OF FILTER COEFFICIENTS TO BE STORED (N) |
|---|---|---|---|---|
| p=1 | ROTATION SYMMETRY $PSF(x, y) = g\left(\sqrt{x^2+y^2}\right)$ | NO PHASE (ZERO PHASE) | | $N = (M+1)((M+1)/2+1)/4$ |
| p=2 | VERTICAL SYMMETRY $PSF(x, y) = PSF(x, -y)$ | PHASE PRESENT | | $N = (M+1)(M-1)/4$ |
| p=3 | HORIZONTAL SYMMETRY $PSF(x, y) = PSF(-x, y)$ | PHASE PRESENT | | $N = (M+1)(M-1)/4$ |
| p=4 | POINT SYMMETRY $PSF(x, y) = PSF(-x, -y)$ | NO PHASE (ZERO PHASE) | | $N = (M+1)^2/4$ |
| p=5 | ASYMMETRY | PHASE PRESENT | | $N = M^2$ |

FIG.7

| IDENTIFIER p (PSF INFORMATION ID) | PSF SYMMETRY | PHASE | DOMAIN OF PSF TO BE STORED | DOMAIN OF OTF TO BE STORED |
|---|---|---|---|---|
| p = 1 | ROTATION SYMMETRY $PSF(x, y) = g\left(\sqrt{x^2+y^2}\right)$ | NO PHASE (ZERO PHASE) | $x \geq 0, \ y = 0$ | $\omega_x \geq 0, \ \omega_y = 0$ |
| p = 2 | VERTICAL SYMMETRY $PSF(x, y) = PSF(x, -y)$ | PHASE PRESENT | $y \geq 0$ | $\omega_x \geq 0, \ \omega_y \geq 0$ $\omega_x < 0, \ \omega_y \geq 0$ |
| p = 3 | HORIZONTAL SYMMETRY $PSF(x, y) = PSF(-x, y)$ | PHASE PRESENT | $x \geq 0$ | $\omega_x \geq 0, \ \omega_y \geq 0$ $\omega_x \geq 0, \ \omega_y < 0$ |
| p = 4 | POINT SYMMETRY $PSF(x, y) = PSF(-x, -y)$ | NO PHASE (ZERO PHASE) | SAME AS ABOVE | $\omega_x \geq 0$ |
| p = 5 | ASYMMETRY | PHASE PRESENT | NO LIMITATION ON DOMAIN | NO LIMITATION ON DOMAIN |

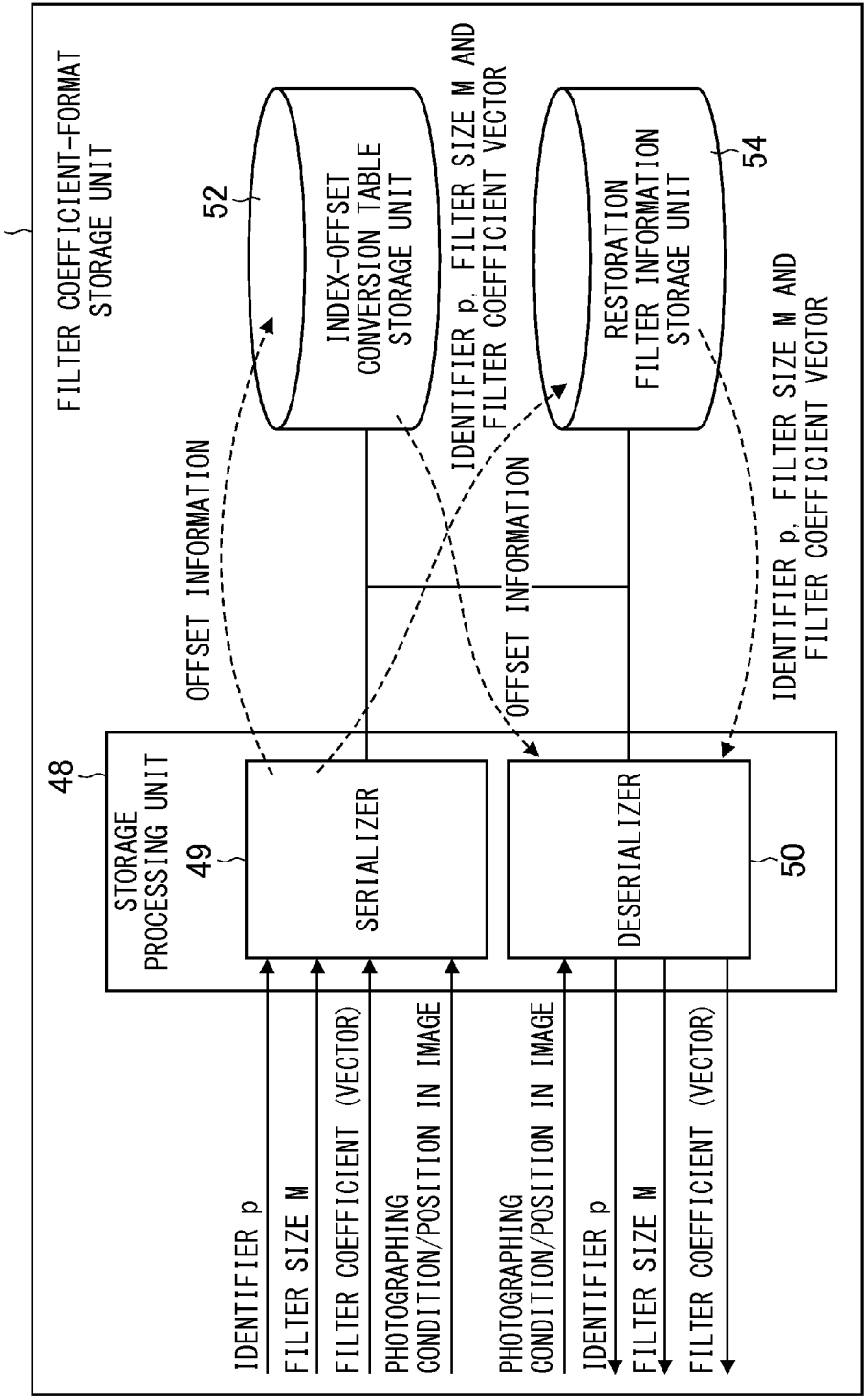

FIG.10

| EMBODIMENT | RESTORATION CONDITION PARAMETER CALCULATING UNIT (STATISTICAL INFORMATION ACQUIRING UNIT/STATISTICAL INFORMATION STORAGE UNIT) | PSF STORAGE UNIT (OPTICAL INFORMATION STORAGE UNIT) | FILTER INFORMATION DATA CALCULATING UNIT | FILTER COEFFICIENT CALCULATING UNIT | FILTER COEFFICIENT-FORMAT STORAGE UNIT | RESTORATION FILTER COEFFICIENT FORMAT CONVERSION UNIT | SIGNAL PROCESSING UNIT |
|---|---|---|---|---|---|---|---|
| 1 | CAMERA BODY | CAMERA BODY | CAMERA BODY | CAMERA BODY | CAMERA BODY | CAMERA BODY | CAMERA BODY |
| 2 | CAMERA BODY | INTERCHANGEABLE LENS UNIT | CAMERA BODY | CAMERA BODY | CAMERA BODY | CAMERA BODY | CAMERA BODY |
| 3 | CAMERA BODY | SERVER →INTERNET →CAMERA BODY | CAMERA BODY | CAMERA BODY | CAMERA BODY | CAMERA BODY | CAMERA BODY |
| 4 | CAMERA BODY (Exif) | PC (PREINSTALLATION OR DOWNLOAD FROM SERVER) | PC | PC | PC | PC | PC |
| 5 | CAMERA BODY (Exif) | INTERCHANGEABLE LENS UNIT | PC | PC | PC | PC | PC |

IMAGE PROCESSING DEVICE, IMAGING DEVICE, COMPUTER, IMAGE PROCESSING METHOD AND COMPUTER READABLE NON-TRANSITORY MEDIUM

CROSS-REFERENCE TO RELATED APPLICATIONS

This application is a Continuation of PCT International Application No. PCT/JP2013/062001 filed on Apr. 24, 2013, which claims priority under 35 U.S.C. §119(a) to Japanese Patent Application No. 2012-212243 filed on Sep. 26, 2012 and Japanese Patent Application No. 2013-040681 filed on Mar. 1, 2013. Each of the above applications is hereby expressly incorporated by reference, in their entirety, into the present application.

BACKGROUND OF THE INVENTION

1. Field of the Invention

The present invention relates to an image processing device, an imaging device, a computer, an image processing method and a computer readable non-transitory medium, and in particular, relates to a restoration filter used in point image restoration processing.

2. Description of the Related Art

In a subject image photographed through an imaging optical system, a so-called point spread phenomenon that a point subject has a minute spread is sometimes seen because of influence of diffraction or aberration due to the imaging optical system. A function indicating a response to a point light source of an optical system is called a point spread function (PSF), and is known as a parameter that controls resolution degradation (blur) of a photographed image.

A photographed image whose image quality is degraded due to the point spread phenomenon can recover from image quality degradation by receiving point image restoration processing based on the PSF. The point image restoration processing is processing of obtaining a degradation characteristic (point image characteristic) due to the aberration of a lens (optical system) or the like beforehand and canceling a point spread of the photographed image by image processing using a restoration filter (recovery filter) according to the point image characteristic.

For the point image restoration processing, various contrivances have been proposed. For example, Japanese patent application publication No. 2003-172873 discloses a correction data preparation method capable of compensating degradation of an optical performance off an optical axis by using a rotation-symmetrical sharpness recovery filter instead of a rotation-asymmetrical sharpness recovery filter in light of symmetry of the spread of the PSF. Also, Japanese patent application publication No. 2012-129932 discloses an image processing method of correcting color shift due to chromatic aberration of magnification by generating a recovery image using an image recovery filter based on an optical transfer function and reducing the color shift of the recovery image.

Since this point spread phenomenon variously changes depending on photographing conditions such as a diaphragm, a zoom position and a subject distance and an image height position and the like, even for a single imaging system, a data amount of the PSF and the like required for the point image restoration processing becomes huge. Then, Japanese patent application publication No. 2012-073691 discloses an image processing device for reducing a storage amount of data required for reconfiguration of an optical transfer function of an imaging optical system, to reduce a storage data amount of the PSF.

As described above, while a huge amount of storage data is required in order to appropriately perform the point image restoration processing utilizing a restoration filter, reduction of a storage data amount is one of big problems. On the other hand, storage of the restoration filter in prescribed storage means for the point image restoration processing is extremely strongly demanded, and by storing the prepared restoration filter and reading the stored restoration filter upon utilization, calculation loads can be reduced and a processing speed can be accelerated. However, since the restoration filter is configured by many taps and a filter coefficient is allocated to each tap, the storage loads are extremely large.

In the apparatuses disclosed in Japanese patent application publication No. 2003-172873 and Japanese patent application publication No. 2012-129932, no device to effectively reduce the data amount of the restoration filter of the point image restoration processing while maintaining point image restoration accuracy is employed in particular. That is, in Japanese patent application publication No. 2003-172873, a device for improving image quality degradation in an area away from an optical axis by a sharpening filter having a rotation-symmetrical coefficient is proposed; however, since the sharpening filter having the rotation-symmetrical coefficient is approximately applied in the case where a blur characteristic of the optical system is rotation-asymmetrical, accuracy of point image restoration drops. Also, in Japanese patent application publication No. 2012-129932, no device is suggested regarding reduction of the storage data amount of the point image restoration filter.

Also, while Japanese patent application publication No. 2012-073691 discloses a technology of reducing a storage amount of data required for reconfiguration of the optical transfer function of the imaging optical system, no device to directly reduce the storage data amount of the restoration filter for the point image restoration processing is disclosed or suggested. That is, the technology disclosed in Japanese patent application publication No. 2012-073691 is for reducing an information amount of the optical transfer function for preparing an image recovery filter, but is not for reducing the storage amount of the prepared image recovery filter itself.

SUMMARY OF THE INVENTION

The present invention has been contrived in view of the above-mentioned circumstances, an object of the present invention being to provide a technology capable of reducing the data storage amount of the restoration filter used in point image restoration processing while suppressing the degradation of point image restoration accuracy.

One aspect of the present invention is directed to an image processing device including a statistical information acquiring unit that acquires statistical information related to point image restoration of an image, an optical information acquiring unit that acquires optical information indicating a point image intensity distribution of an optical system used when acquiring the image, a filter information calculating unit that obtains filter information of a restoration filter for point image restoration processing of the image on the basis of at least one of the statistical information and the optical information, a filter coefficient calculating unit that calculates a filter coefficient of the restoration filter on the basis of the statistical information and the optical information with the filter information as a constraint condition, and a point image restoration processing unit that performs the point image restoration processing using the filter coefficient calculated in the filter coefficient calculating unit.

According to this aspect, filter information of a restoration filter is obtained on the basis of at least one of the statistical information related to point image restoration of an image and the optical information indicating the point image intensity distribution of the optical system, and a filter coefficient of the restoration filter is calculated with the filter information as a constraint condition. Therefore, without lowering accuracy of the point image restoration processing, a data storage amount of the restoration filter used in the point image restoration processing can be reduced. By determining an information amount (format) of the restoration filter beforehand according to characteristics of the point image intensity distribution (optical transfer function) and generating the restoration filter with it (e.g. the number of taps, symmetry, or the like) as a constraint condition, while reducing the information amount required for storing the filter coefficient, it is possible to design the restoration filter of the best characteristic in the range.

The "statistical information related to point image restoration of an image" here is a statistical information that may influence the point image restoration of the image, and may include an SN ratio for example. Also, the "optical information indicating a point image intensity distribution of an optical system" is an optical information directly or indirectly indicating the point image intensity distribution due to the optical system. For example, the PSF and OTF (Optical Transfer Function) (including MTF: Modulation Transfer Function and PTF: Phase Transfer Function) may be included in the optical information. Also, "filter information of a restoration filter" is an information indicating a filter characteristic of the restoration filter used in the point image restoration processing, and may include a tap configuration (the total number of taps, tap symmetry, the minimum requirement number of taps when the symmetry is taken into consideration, and the like) of the restoration filter for example. Also, the "filter coefficient" is a coefficient applied to image data (pixel data) of a processing target in filtering processing, and in the case where the restoration filter is configured by a plurality of taps, the filter coefficient is allocated to each tap. Also, the "point image restoration" is canceling point spread and restoring an original point image, and the "point image restoration processing" is processing of performing such point image restoration. An arbitrary method can be used for the point image restoration processing, and for example it is possible to adopt processing of applying the restoration filter configured by the plurality of taps to a processing target image for obtaining weighted average of respective pixel data of the processing target image and filter coefficients.

Preferably, the filter information includes information related to the number of taps of the restoration filter and information indicating a kind of symmetry of the restoration filter, and the filter coefficient calculating unit calculates the filter coefficient with the information related to the number of the taps of the restoration filter and the information indicating the kind of the symmetry of the restoration filter obtained by the filter information calculating unit as constraint conditions.

In this case, since the filter coefficient is calculated with "the information related to the number of the taps of the restoration filter" and "the information indicating the kind of the symmetry of the restoration filter" as the constraint conditions, it is possible to reduce an information amount of the filter coefficient required for the restoration filter according to the kind of the symmetry of the restoration filter. Also, the information amount of the filter coefficient required for the restoration filter is an information amount capable of reproducing a complete restoration filter from "the information related to the number of the taps of the restoration filter" and "the information indicating the kind of the symmetry of the restoration filter".

Preferably, the optical information includes information indicating a kind of symmetry of the point image intensity distribution, and compressed information capable of reproducing the point image intensity distribution on the basis of the kind of the symmetry of the point image intensity distribution, which is the compressed information associated with the information indicating the kind of the symmetry of the point image intensity distribution, and the filter information calculating unit obtains the information indicating the kind of the symmetry of the restoration filter from the information indicating the kind of the symmetry of the point image intensity distribution, and obtains the information related to the number of the taps of the restoration filter on the basis of the compressed information associated with the information indicating the kind of the symmetry of the point image intensity distribution and the statistical information.

In this case, since the information related to the number of the taps of the restoration filter can be obtained from the compressed information associated with the information indicating the kind of the symmetry of the point image intensity distribution, it is possible to reduce the information amount required for the optical information indicating the point image intensity distribution according to the symmetry of the point image intensity distribution. Also, by using the compressed information (optical transfer function information) capable of reproducing the point image intensity distribution on the basis of the kind of the symmetry of the point image intensity distribution, determination of a filter information amount (format) is facilitated, and it is also possible to reduce a computation amount in filter design.

The "compressed information capable of reproducing the point image intensity distribution on the basis of the kind of the symmetry of the point image intensity distribution" is an information which is compressed (for which the information amount is reduced) so as to reproduce the original point image intensity distribution by considering the kind of the symmetry of the point image intensity distribution.

Preferably, the optical information acquiring unit acquires the optical information and the information indicating the kind of the symmetry of the restoration filter associated with the point image intensity distribution, the filter information includes the information related to the number of the taps of the restoration filter, and the filter coefficient calculating unit calculates the filter coefficient with the information related to the number of the taps of the restoration filter obtained by the filter information calculating unit and the information indicating the kind of the symmetry of the restoration filter acquired by the optical information acquiring unit as the constraint conditions.

In this case, since the information indicating the kind of the symmetry of the restoration filter is acquired together with the optical information, it is not needed to obtain "the information indicating the kind of the symmetry of the restoration filter" in the filter information calculating unit.

Preferably, the image processing device further includes a storage unit that stores the filter coefficient and the filter information corresponding to the filter coefficient in association with each other.

In this case, since the filter coefficient and the filter information are stored in the storage unit, it is possible to easily obtain the filter coefficient and the filter information by accessing the storage unit, and it is not needed to calculate these filter coefficient and filter information again. Also, in the case of compressed filter coefficient information, it is also possible to record it in the storage unit in a form as it is without adding redundancy.

Preferably, the image processing device further includes a restoration filter preparing unit that prepares the restoration filter on the basis of the filter coefficient and the filter information stored in the storage unit.

In this case, the point image restoration processing unit can perform appropriate point image restoration processing by using the restoration filter prepared by the restoration filter preparing unit. It is also possible to use the restoration filter by the same restoration filter application device without depending on a compression format of the filter coefficient.

Preferably, the storage unit stores the filter coefficient and the filter information according to an acquisition condition of the image and a position in the image indicated by the image, and stores an index-offset conversion table in which the acquisition condition of the image and the position in the image indicated by the image and a memory address of the storage unit where the filter coefficient and the filter information associated with each other are stored are associated with each other. The restoration filter preparing unit reads the filter coefficient and the filter information according to the acquisition condition of the image and the position in the image indicated by the image from the storage unit, on the basis of the index-offset conversion table.

In this case, it is possible to refer to the corresponding memory address in the index-offset conversion table, and to directly read (randomly access) the filter coefficient and the filter information according to the acquisition condition of the image and the position in the image indicated by image data from the storage unit.

Preferably, the point image restoration processing unit has an exclusive restoration processing unit for each of the plurality of kinds of the symmetry of the restoration filter, the restoration filter preparing unit has a format conversion unit having a filter-format conversion table indicating correspondence between the kind of the symmetry of the restoration filter and the restoration processing unit, and the format conversion unit specifies the corresponding restoration processing unit by obtaining the kind of the symmetry of the restoration filter from the filter information read from the storage unit on the basis of the filter-format conversion table. The restoration filter preparing unit sends processing unit indicating information indicating the corresponding restoration processing unit specified by the format conversion unit together with the filter coefficient read from the storage unit to the restoration processing unit as the restoration filter, and the restoration processing unit performs the point image restoration processing using the filter coefficient sent from the restoration filter preparing unit by the restoration processing unit indicated by the processing unit indicating information sent from the restoration filter preparing unit.

In this case, it is possible to optimize the point image restoration processing by performing the point image restoration processing by the exclusive restoration processing unit according to the kind of the symmetry of the filter.

Preferably, the optical system includes a lens unit that modulates a phase and extends a depth of field.

According to this aspect, even for an image obtained through a so-called EDoF (Extended Depth of Field (Focus)) optical system, without lowering the accuracy of the point image restoration processing, the data storage amount of the restoration filter used in the point image restoration processing can be reduced. Also, a method of modulating the phase in the lens unit (optical phase modulation means) is not limited in particular, and it is possible to provide a phase modulating unit between lenses or make the lens itself (an incidence plane/output plane of the lens, for example) have a phase modulating function.

Another aspect of the present invention is directed to an imaging device including a statistical information storage unit that stores the statistical information related to the point image restoration of an image, an optical information storage unit that stores the optical information indicating the point image intensity distribution of the optical system used when acquiring the image, and the above-described image processing device that is connected to the statistical information storage unit and the optical information storage unit.

Another aspect of the present invention is directed to an imaging device including a lens unit and a body unit connected to the lens unit, the lens unit includes the optical information storage unit that stores the optical information indicating the point image intensity distribution of the optical system used when acquiring an image, and the body unit includes the statistical information storage unit that stores the statistical information related to the point image restoration of the image, and the above-described image processing device that is connected to the statistical information storage unit and the optical information storage unit.

Another aspect of the present invention is directed to a computer to which the statistical information related to the point image restoration of an image is inputted together with the image, including the optical information storage unit that stores the optical information indicating the point image intensity distribution of the optical system used when acquiring the image, and the above-described image processing device that is connected to the optical information storage unit.

Another aspect of the present invention is directed to a computer to which the statistical information related to the point image restoration of an image and the optical information indicating the point image intensity distribution of the optical system used when acquiring the image are inputted together with the image, including the above-described image processing device.

Another aspect of the present invention is directed to a program for making a computer execute a process of acquiring the statistical information related to the point image restoration of an image, a process of acquiring the optical information indicating the point image intensity distribution of the optical system used when acquiring the image, a process of obtaining the filter information of the restoration filter for the point image restoration processing of the image, on the basis of at least one of the statistical information and the optical information, a process of calculating the filter coefficient of the restoration filter, on the basis of the statistical information and the optical information with the filter information as a constraint condition, and a process of performing the point image restoration processing using the calculated filter coefficient.

According to the present invention, the filter information of the restoration filter is obtained on the basis of at least one of the statistical information related to the point image restoration of an image and the optical information indicating the point image intensity distribution of the optical system, and the filter coefficient of the restoration filter is calculated with the filter information as a constraint condition.

Thus, without lowering the accuracy of the point image restoration processing, the data storage amount of the restoration filter used in the point image restoration processing can be reduced.

BRIEF DESCRIPTION OF THE DRAWINGS

FIG. 5 is a table illustrating relationships of a format identifier (filter information ID), symmetry of PSF, presence/absence of a phase component, an arrangement format of a restoration filter (filter coefficient) and the number of the filter coefficients (the number of taps) to be stored.

FIG. 7 is a table illustrating a relationship of optical transfer functions (PSF, OTF) stored in a PSF storage unit according to a second embodiment.

FIG. 8 is a functional block diagram illustrating a filter coefficient-format storage unit according to a third embodiment.

FIG. 10 is a table illustrating an example (embodiment) related to installation of individual processing units.

DESCRIPTION OF THE PREFERRED EMBODIMENTS

An embodiment of the present invention will be described with reference to appended drawings. In the following description, as one example, an example of applying the present invention to a digital camera (imaging device) connectable to a computer (PC: personal computer) will be described.

Figure 1:
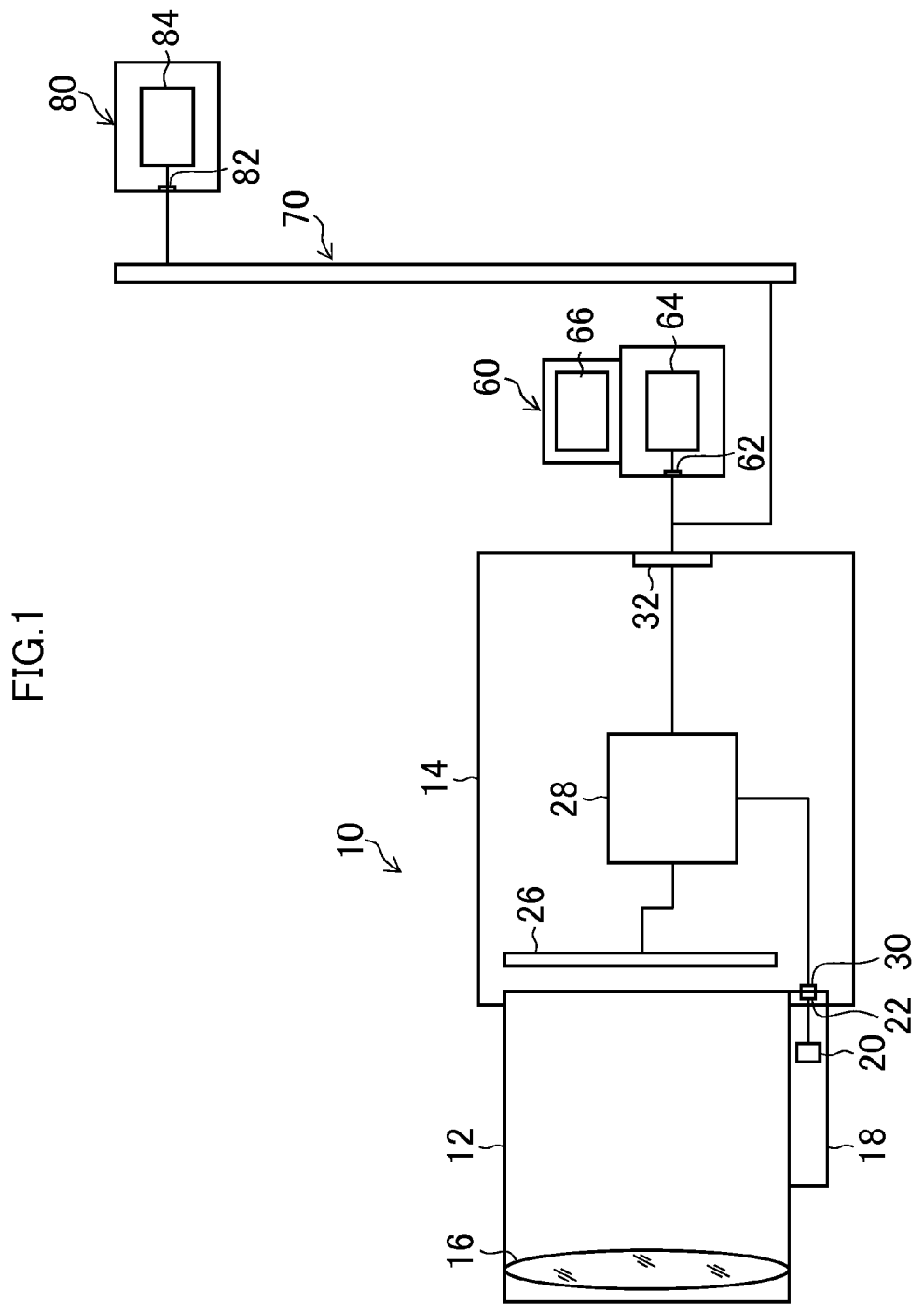
FIG. 1 is a block diagram illustrating an outline of a digital camera connected to a computer.

FIG. 1 is a block diagram illustrating an outline of a digital camera connected to a computer.

A digital camera 10 includes an interchangeable lens unit 12 and a camera body (body unit) 14 having an imaging element 26, and the lens unit 12 and the camera body 14 are electrically connected through a lens unit terminal 22 of the lens unit 12 and a camera body terminal 30 of the camera body 14.

The lens unit 12 includes an optical system having a lens 16 and a diaphragm (omitted in the figure) and an optical system operating unit 18 that controls the optical system, and the optical system operating unit 18 includes a lens unit controller 20 connected to the lens unit terminal 22 and an actuator (omitted in the figure) that operates the optical system. The lens unit controller 20 controls the optical system through the actuator on the basis of control signals sent from the camera body 14 through the lens unit terminal 22, and performs, for example, focus control and zoom control by lens movement, stop amount control of the diaphragm, and the like.

The imaging element 26 of the camera body 14 has color filters of RGB and the like and an image sensor (a CMOS, a CCD or the like), converts light of a subject image irradiated through the optical system (the lens 16, the diaphragm, and the like) of the lens unit 12 to electric signals, and sends image signals to a camera body controller (image processing device) 28.

The camera body controller 28 generally controls the camera body 14, for example, controls output of the image signals (image data) from the imaging element 26, image-processes the image signals from the imaging element 26, prepares the control signals for controlling the lens unit 12 and transmits them through the camera body terminal 30 to the lens unit 12 (the lens unit controller 20), and transmits the image data (RAW data, JPEG data or the like) before and after image processing to an external device (a computer 60 or the like) connected through an input/output interface 32.

The camera body controller 28 can perform arbitrary image processing as needed, and can perform sensor correction processing, demosaic (synchronization) processing, pixel interpolation processing, color correction processing (white balance processing, color matrix processing, gamma conversion processing, and the like), RGB image processing (sharpness processing, tone correction processing, exposure correction processing, and the like), and JPEG compression processing. In addition, the camera body controller 28 of this example executes so-called point image restoration processing to the image data. Details of the point image restoration processing will be described later.

The image data that has been image-processed in the camera body controller 28 is sent to the computer 60 or the like connected to the input/output interface 32. A format of the image data to be sent to the computer 60 or the like is not limited in particular and may be an arbitrary format such as RAW, JPEG or TIFF. Therefore, the camera body controller 28 may, like a so-called Exif format, associate header information (photographing information (photographing date and time, a model, a number of pixels, a diaphragm value and the like) and the like), main image data and thumbnail image data with each other to configure one image file, and the image file may be transmitted from the camera body 14 to the computer 60.

The computer 60 is connected to the digital camera 10 through the input/output interface 32 of the camera body 14 and a computer terminal 62, and receives data such as the image data sent from the camera body 14. A computer controller 64 of the computer 60 generally controls the computer 60, image-processes the image data from the digital camera 10, and controls communication with a server 80 connected to the computer terminal 62 through a network line such as the Internet 70. The computer 60 has a display 66, and processing contents and the like in the computer controller 64 is displayed on the display 66 as needed. By operating input means (omitted in the figure) such as a keyboard while confirming display on the display 66, a user can input data and instructions to the computer controller 64 and control the digital camera 10 and the server 80 connected to the computer 60.

The server 80 includes a server terminal 82 and a server controller 84. The server terminal 82 configures a transmission/reception connection unit with the external devices such as the computer 60, and is connected through the Internet 70 to the computer terminal 62 of the computer 60. The server controller 84 cooperates with the computer controller 64 according to the control signals from the computer 60, downloads data to the computer 60, performs arithmetic processing and transmits the arithmetic result to the computer 60.

Also, the individual controllers (the lens unit controller 20, the camera body controller 28, the computer controller 64, and the server controller 84) include circuits required for control processing, and include an arithmetic processing circuit (a CPU or the like), a memory, and the like for example.

Next, the point image restoration processing of imaging data (image data) of the subject image obtained through the imaging element 26 will be described. Also, in the present example, an example of executing the following series of point image restoration processing in the camera body 14 (the camera body controller 28) will be described, but all or part of the point image restoration processing may be executed in another controller (e.g. the lens unit controller 20, the computer controller 64, or the like) (see FIG. 10).

Figure 2:
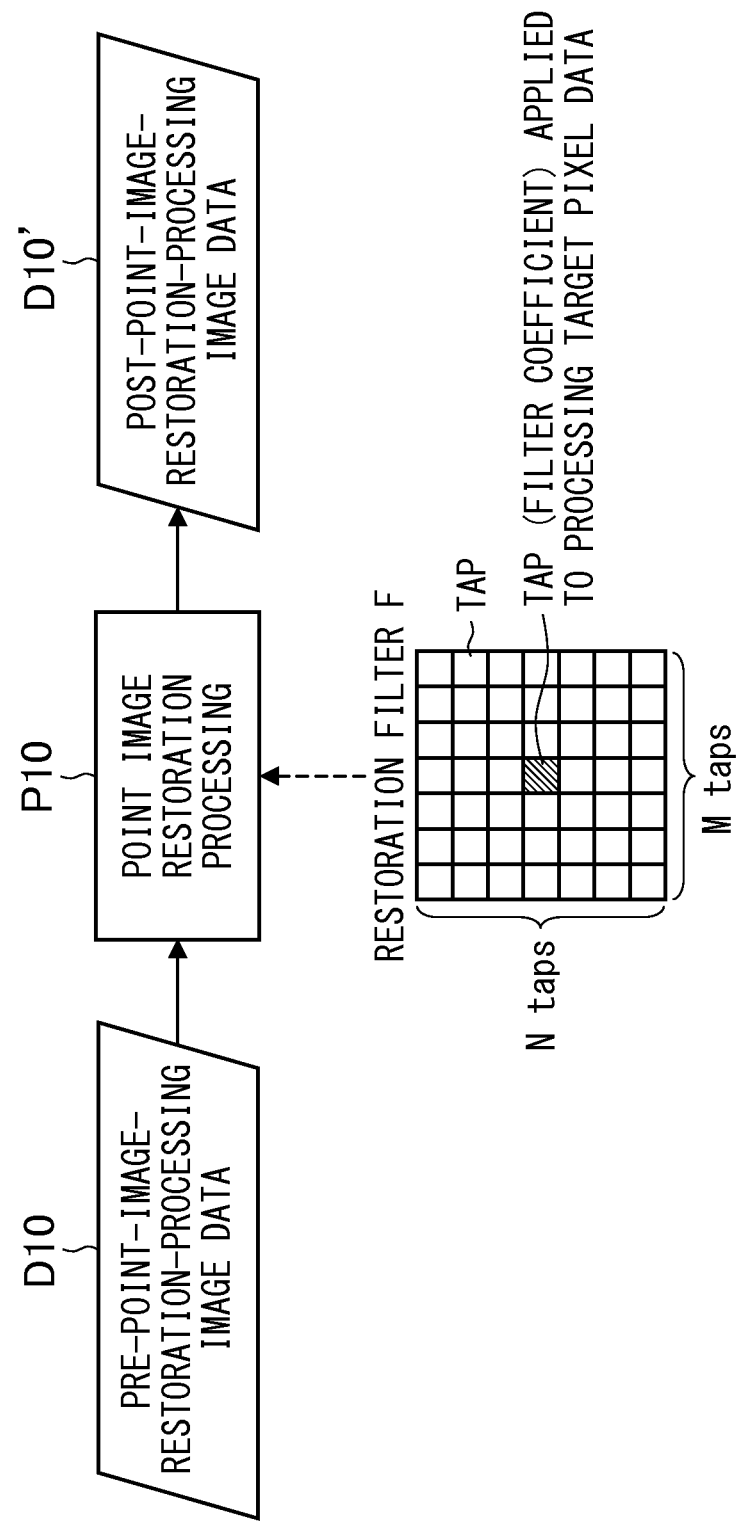
FIG. 2 is a block diagram illustrating an outline of one example of point image restoration processing.

FIG. 2 is a block diagram illustrating an outline of one example of the point image restoration processing.

Point image restoration processing P10 is a processing of preparing post-point-image-restoration-processing image data D10' from pre-point-image-restoration-processing image data D10 by filtering processing using a restoration filter F. That is, by applying the restoration filter F configured by N×M taps to the image data of a processing target and computing a weighted average of the filter coefficients allocated to the individual taps and corresponding pixel data (processing target pixel data and adjacent pixel data of the pre-point-image-restoration-processing image data D10), the pixel data after the point image restoration processing (the post-point-image-restoration-processing image data D10') can be calculated. By applying this weighted average processing using the restoration filter F to the entire pixel data configuring the image data by changing a target pixel in order, the point image restoration processing can be performed.

Also, the restoration filter F is prepared according to photographing conditions (a lens kind, the diaphragm, a zoom position, a subject distance, and the like) and individual conditions of a position (image height) within the image, and in the point image restoration processing P10, a restoration filter F according to the conditions (the photographing conditions, the position in the image, or the like) of the pixel data of the processing target is selected and used. Therefore, as the photographing conditions (the diaphragm, the zoom position, the subject distance, and the like) and the conditions of the position (image height) within the image and the like increase, a data amount of the restoration filter F to be prepared increases, and a storage data amount of the restoration filter F becomes huge. However, according to the following individual embodiments, such a required storage amount of the restoration filter F can be reduced.

First Embodiment

Generally, a restoration filter size of the point image restoration processing is correlated with a size of the PSF, and it is desirable to perform the point image restoration processing by the restoration filter with the larger number of taps for the PSF of larger point spread. Also, when the PSF is a symmetrical form, the restoration filter also becomes the symmetrical form and therefore an information amount of the restoration filter can be compressed by utilizing such symmetry. That is, by designing the restoration filter in consideration of "a feature (symmetry) of optical information (PSF or the like) indicating a point image intensity distribution of an optical system" and "another characteristic (the number of taps) for filter information compression" as constraint conditions, information required for the restoration filter can be efficiently compressed without lowering accuracy of the point image restoration processing.

Figure 3:
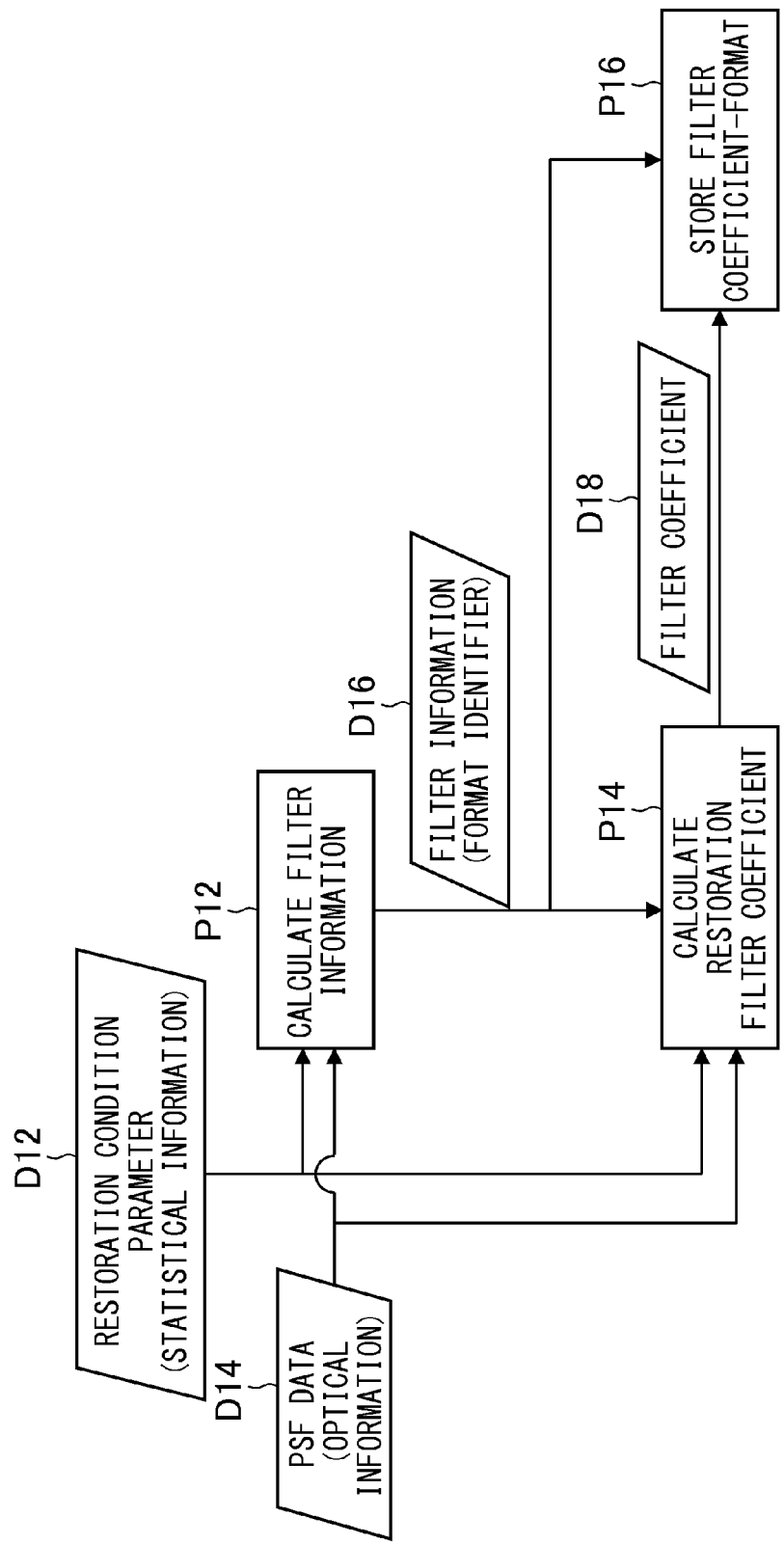
FIG. 3 is a block diagram illustrating a method of preparing and storing a restoration filter of the point image restoration processing according to a first embodiment, and is a diagram mainly illustrating flow of data.

FIG. 3 is a block diagram illustrating a method of preparing and storing the restoration filter of the point image restoration processing according to a first embodiment, and is a diagram mainly illustrating a flow of data.

In the present embodiment, statistical information (restoration condition parameter) D12 related to point image restoration of image data is acquired, and optical information (PSF) D14 indicating the point image intensity distribution of the optical system used when acquiring the image data is acquired. Then, on the basis of the acquired restoration condition parameter D12 and PSF data D14, filter information D16 of the restoration filter for the point image restoration processing of the image data is obtained (P12 in FIG. 3).

The restoration condition parameter D12 includes the statistical information (such as an SN ratio) of input image data in the point image restoration processing, is additional information required for preparing the restoration filter of the point image restoration processing, and is the information other than the PSF data D14.

An example of the optical information indicating the point image intensity distribution of the optical system is the PSF (point spread function). The PSF indicates a point image spread (PSF shape) under given conditions, and is changed according to the photographing condition and the position in the image. Also, the optical information is not limited to the PSF and may be OTF (MTF, PTF) or the like obtained by Fourier-transforming the PSF, and in the present embodiment, the PSF is used as the optical information as one example.

The filter information D16 includes information other than the filter coefficient required at least for restoring the restoration filter of the point image restoration processing corresponding to the PSF data D14 from the restoration condition parameter D12 and the PSF data D14 with constant accuracy. Specifically, for example, information related to the number of taps of the restoration filter and information indicating a kind (point symmetry, rotation symmetry, or the like) of symmetry of the restoration filter may be included in the filter information D16.

For example, it is possible to set the number of all the taps of the restoration filter to be large in the case where the size of the PSF shape (point spread) is large, set the symmetry of the restoration filter to be the point symmetry in the case where the PSF shape is the point symmetry, and set the symmetry of the restoration filter to be the rotation symmetry in the case where the PSF shape is the rotation symmetry. Also, in consideration of the symmetry of the restoration filter, the number of the taps of the restoration filter required for reproducing the restoration filter is determined, and specifically, the minimum number of the taps to be stored is determined on the basis of the total number of the taps configuring the restoration filter and the symmetry.

These pieces of filter information (the symmetry, the number of the taps of the restoration filter, and the like) are associated with each other, and format identifiers (filter information IDs) are allocated. A relationship between these pieces of filter information and the format identifiers (filter information IDs) will be described later (see FIG. 5).

Then, with the filter information D16 as a constraint condition, on the basis of the restoration condition parameter (the statistical information) D12 and the PSF data (the optical information) D14, a filter coefficient D18 of the restoration filter is calculated (P14). That is, under the constraint condition of the information amount (e.g. the number of the taps and the symmetry) of the restoration filter, the filter coefficient with the highest performance is calculated.

For example, in the case where the filter information includes the data related to the number of the taps of the restoration filter and the data indicating the kind of the symmetry of the restoration filter, it is possible to calculate the filter coefficient with the data related to the number of the taps of the restoration filter and the data indicating the kind of the symmetry of the restoration filter as the constraint conditions. In this case, the filter coefficient is calculated for each tap of the restoration filter required for reproducing the restoration filter. Therefore, in the case where the restoration filter has prescribed symmetry and the number of the taps of the restoration filter required for reproducing the restoration filter is smaller than the original number of the taps configuring the restoration filter, the information amount of the filter coefficient can be reduced (compressed). By optimally designing the filter coefficient after specifying the constraint conditions in this way, the point image restoration accuracy by the restoration filter can be improved compared to the case of performing lossy compression of the filter coefficient forcibly after designing the restoration filter.

An example of calculating the filter coefficient D18 from both of the restoration condition parameter (the statistical information) D12 and the PSF data (the optical information) D14 will be described below, but it is also possible to calculate the filter coefficient D18 from the PSF data (optical information) D14 only, and the filter coefficient D18 can be calculated even in the case where the restoration condition parameter (the statistical information) D12 is unknown.

Then, the calculated filter coefficient D18 and the filter information (filter format) D16 corresponding to the filter coefficient D18 are, in a state of being associated with each other, stored in a memory (ROM or the like) (P16).

Figure 4:
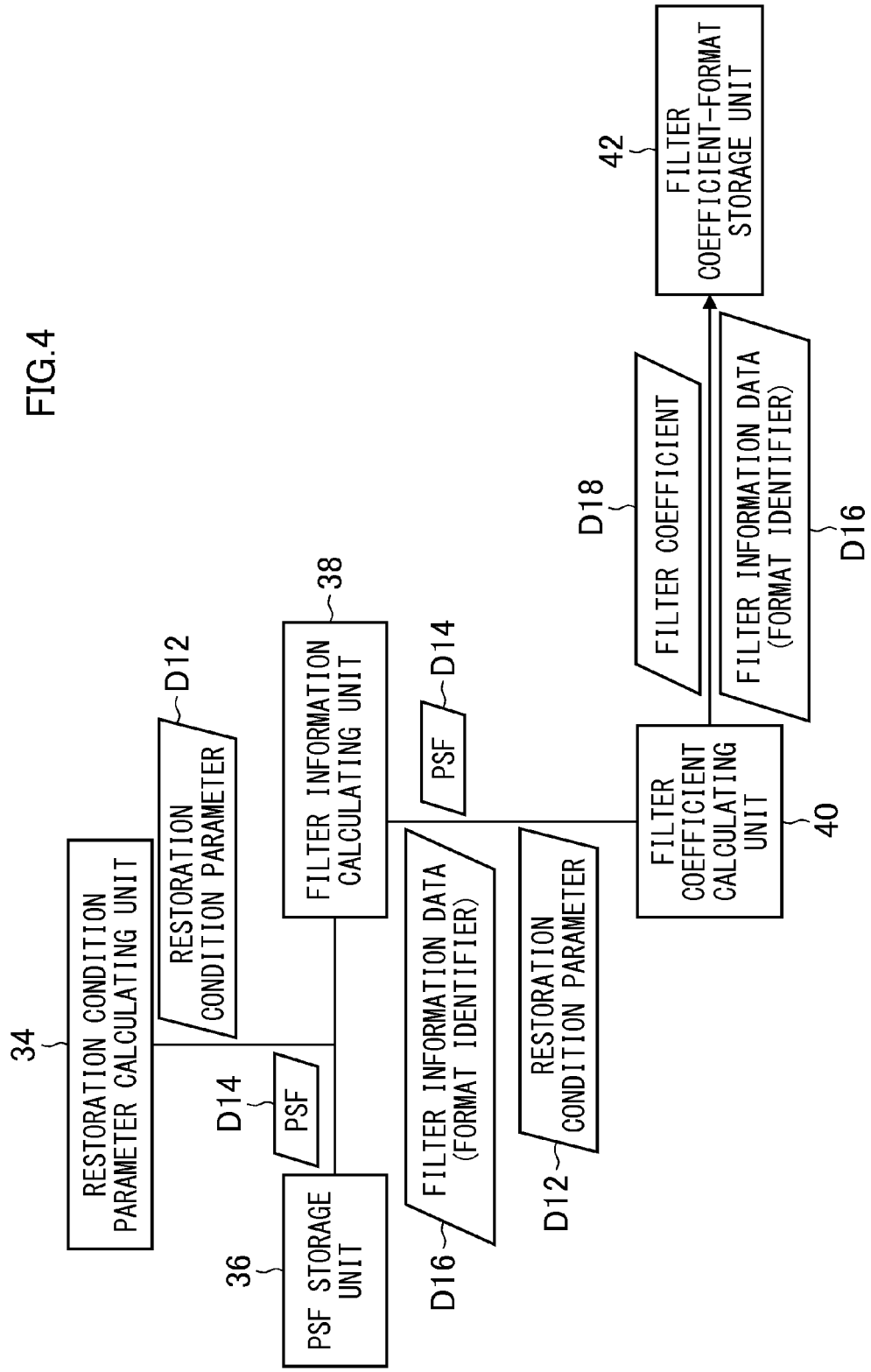
FIG. 4 is a functional block diagram of a controller that performs data processing illustrated in FIG. 3.

FIG. 4 is a functional block diagram of a controller that performs data processing illustrated in FIG. 3. In this example, the following restoration condition parameter calculating unit 34, PSF storage unit 36, filter information calculating unit 38, filter coefficient calculating unit 40, and filter coefficient-format storage unit 42 are configured by the camera body controller 28 (see FIG. 1).

First, the restoration condition parameter (the statistical information: the SN ratio or the like) D12 is acquired by the restoration condition parameter calculating unit (statistical information acquiring unit) 34, and the restoration condition parameter D12 is sent to the filter information calculating unit 38.

The restoration condition parameter calculating unit 34 calculates and acquires the statistical information (the SN ratio or the like) of an input image related to the restoration, and outputs the statistical information as the restoration condition parameter D12. Generally, the SN ratio of a photographing target image is required for image restoration with a Wiener filter. The SN ratio in this case is required for each frequency, and is expressed by $SNR(\omega_x, \omega_y)$. Here, $\omega_x$ and $\omega_y$ are angular frequencies in an x axis direction and a y axis direction respectively. Information of the SN ratio is generally calculated from an ISO speed used in the digital camera 10, a data value of an OB (optical black) region of the imaging element 26, and the like.

Also, the statistical information such as the SN ratio may be calculated beforehand and stored in a prescribed memory (storage unit). In this case, for example, the restoration condition parameter calculating unit 34 may function as a statistical information storage unit that stores the statistical information related to the restoration of the image data, and the filter information calculating unit 38 may function as the statistical information acquiring unit that acquires the statistical information stored in the restoration condition parameter calculating unit 34.

On the other hand, the PSF storage unit 36 functions as an optical information storage unit that stores the optical information indicating the point image intensity distribution of the optical system used when acquiring the image data. In the PSF storage unit 36 of this example, conditions (PSF conditions) that can influence the point spread function, such as the photographing conditions and the position in the image, and the PSF data D14 according to the individual conditions are, in a state of being associated with each other, stored beforehand. These pieces of the information associated with each other (also noted simply as "the PSF data D14") are sent from the PSF storage unit 36 to the filter information calculating unit 38.

The filter information calculating unit 38 functions as an optical information acquiring unit that acquires the optical information indicating the point image intensity distribution of the optical system used when acquiring the image data, and acquires an optical transfer function (optical information (PSF)) based on lens information. The optical transfer function is determined according to a state of the optical system (e.g. a zoom position, a diaphragm, a focus position, or the like) during photographing and a distance (position) from the center in the image. For a method of acquiring the optical transfer function, a method of reading the optical transfer function from an internal ROM (the camera body controller 28) of the camera body 14, a ROM (the lens unit controller 20) inside the interchangeable lens in the case of an interchangeable lens type camera, the server 80 connected through the Internet 70 in the case where RAW development software is installed in the computer 60, or the like is possible. In this example, the case where the optical transfer function (PSF) is stored in the internal ROM (the camera body controller 28) of the camera body 14 will be described.

Also, the optical transfer function can be expressed by the PSF or OTF. The PSF and the OFT are in such a relationship that they can be obtained by Fourier transformation and inverse Fourier transformation with each other, the PSF is a real function, and the OFT is a function of a complex variable. The MTF and the PTF are the ones with information that are equivalent to these, and indicate an amplitude component and a phase component of the OTF respectively. Therefore, from a viewpoint of the information amount, a combination of the MTF and the PTF becomes equivalent to the OTF or the PSF. These are different depending on the position in the image, and therefore are required to be obtained for each position in the image. Available information of the PSF, the OTF, the MTF and the PTF may be different depending on a system, but at least one of those needs to be acquirable.

The filter information calculating unit 38 that has acquired the restoration condition parameter D12 and the PSF data D14 obtains, on the basis of these pieces of information, the filter information D16 of the restoration filter for the point image restoration processing of the image data. Since the restoration filter may vary according to the above-described PSF conditions (such as the photographing conditions and the position in the image), the filter information calculating unit 38 obtains the filter information for each PSF condition.

FIG. 5 is a table illustrating relationships of the format identifier (filter information ID), the symmetry of the PSF, presence/absence of a phase component, an arrangement format of the restoration filter (the filter coefficient) and the number of the filter coefficients (the number of taps) to be stored. In FIG. 5, as one example, cases where the symmetry of the PSF is "the rotation symmetry", "vertical symmetry", "horizontal symmetry", "the point symmetry", and "asymmetry" are illustrated, and also the cases where the restoration filter is configured by the number of the taps of a square filter of M taps×M taps (7 taps×7 taps at a maximum) are illustrated.

In an item of "filter coefficient arrangement format" indicating the arrangement format of the restoration filter (the filter coefficient) in FIG. 5, among the taps of the restoration filter indicated by symbols 1-9, a-z and A-N, to taps to which a common symbol is allocated, a common filter coefficient is allocated. Also, in the item of "filter coefficient arrangement format", the number of filled taps corresponds to "the number (N) of the filter coefficients to be stored".

For example, in the case where the PSF has the rotation symmetry, the PSF shape has a relationship of "PSF(x, y)=g($\sqrt{(x^2+y^2)}$))", there is no phase, and the number (the number of taps) N of the filter coefficients to be stored is indicated by "N=(M+1)((M+1)/2+1)/4". Also, in the case where the PSF has the vertical symmetry, the PSF shape has a relationship of "PSF(x, y)=PSF(x, −y)", the phase exists, and the number N of the filter coefficients to be stored is indicated by "N=(M+1)(M−1)/4". Also, in the case where the PSF has the horizontal symmetry, the PSF shape has a relationship of "PSF(x, y)=PSF(−x, y)", the phase exists, and the number N of the filter coefficients to be stored is indicated by "N=(M+1)(M−1)/4". Also, in the case where the PSF has the point symmetry, the PSF shape has a relationship of "PSF(x, y)=PSF(−x, −y)", there is no phase, and the number N of the filter coefficients to be stored is indicated by "N=(M+1)$^2$/4". Also, in the case where the PSF has no symmetry, the PSF shape is asymmetry, the phase exists, and the number N of the filter coefficients to be stored is indicated by "N=M$^2$".

The filter information calculating unit 38 illustrated in FIG. 4 calculates the filter information (the number of the taps and the symmetry) on the basis of the restoration condition parameter D12 and the PSF data D14, determines the symmetry of the PSF according to table data illustrated in FIG. 5, and obtains the corresponding filter information ID (format ID: identifier p). The filter information ID (identifier p) is associated with arrangement information of the filter coefficients required for expressing the restoration filter, and held by the filter information calculating unit 38. Generally, when it is a zero phase filter, the filter information amount (the number of the taps to be stored) becomes (roughly) half, and becomes ⅛ if it is the rotation symmetry further. Even in the case of not being zero phase, when it is the vertical symmetry or the horizontal symmetry, the filter information amount (the number of the taps to be stored) can be reduced to half.

In the case where the optical transfer function is given as the PSF, a determination can be made simply by the PSF symmetry only as described above, but in the case where only one of the MTF and the PTF can be utilized, a standard of a selecting method is slightly different. In the case where only the MTF can be utilized, only the restoration by the zero phase filter can be performed inevitably, and the corresponding filter information ID (identifier p) is selected from the first and the fourth of the filter information ID (identifier p) in the example illustrated in FIG. 5 (when the MTF is the rotation symmetry, p=1 in FIG. 5 is determined as the filter information, and when it is not the rotation symmetry, p=4 is determined as the filter information).

Also, the data indicating the kind of the symmetry of the restoration filter may be obtained by the filter information calculating unit 38 from the PSF shape as described above, or may be, in a state of being associated with the PSF, stored in the PSF storage unit 36 in advance, and sent from the PSF storage unit 36 to the filter information calculating unit 38 together with the PSF.

In this case, the filter information calculating unit 38 acquires the PSF and filter information ID data (format ID: identifier p) indicating the kind of the symmetry of the restoration filter associated with the point image intensity distribution by the PSF, from the PSF storage unit 36. The filter information calculated by the filter information calculating unit 38 is the data related to the number of the taps of the restoration filter. Also, the filter coefficient calculating unit 40 calculates the filter coefficient, with the data related to the number of the taps of the restoration filter obtained by the filter information calculating unit 38 and the data indicating the kind of the symmetry of the restoration filter acquired by the filter information calculating unit 38 as the constraint conditions.

The filter information calculating unit 38 determines the filter information ID (identifier p), and then determines a filter size (an M value in the table in FIG. 5). Generally, the number of the taps required for the restoration filter becomes large for the PSF of the larger spread, and it is highly possible that a frequency characteristic becomes steep when the SN ratio is larger, so that it is needed to take the large number of the taps. However, since large computational complexity is needed in order to accurately determine about what number of the taps are required to obtain a filter with desired restoration accuracy, it is realistic to make an empirical prediction with the size of the PSF and the SN ratio as parameters.

Specifically, for each filter information ID, a two-dimensional table is provided, and a filter size is determined as follows.

$$M=Tp(\rho, SNR)$$

Here, p indicates the filter information ID (identifier), ρ indicates the size of the PSF, and SNR indicates the SN ratio. Also, the restoration filter is a square filter of M taps×M taps (the number of taps=M×M). The number of the taps to be stored (a degree of freedom) N is determined by the value of M and equations ("the number (N) of the filter coefficients to be stored") in the table in FIG. 5.

Then, the obtained filter information (the filter information ID (identifier p) and the number of taps) D16 is sent from the filter information calculating unit 38 to the filter coefficient calculating unit 40 together with the PSF data D14 and the restoration condition parameter D12.

The filter coefficient calculating unit 40 calculates the filter coefficient D18 of the restoration filter for each PSF condition (the photographing condition and the position in the image), on the basis of the restoration condition parameter D12 and the PSF data D14 with the sent filter information D16 as the constraint condition. That is, the filter coefficient calculating unit 40 calculates filter coefficients to be allocated to taps to be stored from input image statistical information (SN ratio) and PSF image information (PSF) with the filter information D16 as the constraint condition. Specifically, the filter coefficient calculating unit 40 calculates the frequency characteristic of the restoration filter first.

Generally, for the restoration of a blur based on the PSF, a convolution type Wiener filter can be utilized. Referring to the information of the OTF and the SN ratio, a frequency characteristic $d(\omega_x, \omega_y)$ of the restoration filter can be calculated by the following expression.

$$d(\omega_x, \omega_y) = \frac{H^*(\omega_x, \omega_y)}{\|H(\omega_x, \omega_y)\|^2 + 1/SNR(\omega_x, \omega_y)} \quad \text{Expression 1}$$

Here, $H(\omega_x, \omega_y)$ indicates the OTF, and $H^*(\omega_x, \omega_y)$ indicates a complex conjugate thereof. Also, $SNR(\omega_x, \omega_y)$ indicates the SN ratio.

Design of the filter coefficient is an optimization problem of selecting a coefficient value in such a manner that the frequency characteristic of the filter becomes closest to a desired Wiener frequency characteristic, and the filter coefficient can be appropriately calculated by an arbitrary known method.

This restoration filter design is based on a problem of obtaining Expression 2 below which minimizes an evaluation functional Jp[x]

$$x \in \Re^N \quad \text{Expression 2}$$

For the functional Jp[x], closeness of the ideal frequency characteristic $d(\omega_x, \omega_y)$ of the restoration filter and the frequency characteristic of the actual filter realized by the filter coefficient x is defined by an arbitrary known evaluation method. Since a range of the frequency characteristic that can be realized by the filter depends on the filter format, the evaluation functional becomes a different definition according to the identifier p.

A filter coefficient $x_0$ to be obtained can be expressed as follows.

$$x_0 = \arg\min_{x \in \Re^N} Jp[x] \quad \text{Expression 3}$$

No matter which method is used, computational complexity required for optimization is largely influenced by the degree of freedom (the number of the taps to be stored) N of the filter coefficient, larger computational complexity is required when the degree of freedom N is higher, and tendency of complication of the computational complexity becomes remarkable as the degree of freedom N becomes higher. Therefore, by considering the symmetry of the PSF and the like first and predetermining the filter format, it is possible to substantially reduce the computational complexity required for the filter design.

Also, in comparison with "a case of calculating the filter coefficient of M×M taps first, considering the symmetry of the filter coefficient itself, and conducting lossy compression of the filter coefficient", in the method of determining the filter coefficient according to the above-described example, while the filter coefficient can be directly optimized by frequency approximation, the filter coefficient can be compressed (the degree of freedom N of the filter coefficient can be reduced). Therefore, it is possible to obtain a more desirable filter coefficient regarding the frequency characteristic of the restoration filter.

The calculated filter coefficient D18 is associated with the filter information D16 and the PSF condition, sent from the filter coefficient calculating unit 40 to the filter coefficient-format storage unit 42, and stored in the filter coefficient-format storage unit 42. The filter coefficient-format storage unit 42 stores the filter coefficient D18 and the filter information D16 corresponding to the filter coefficient D18 in association with each other, and stores the filter coefficient D18 and the filter information D16 according to the PSF condition (e.g. an acquisition condition (photographing condition) of the image data and the position in the image indicated by the image data).

Figure 6:
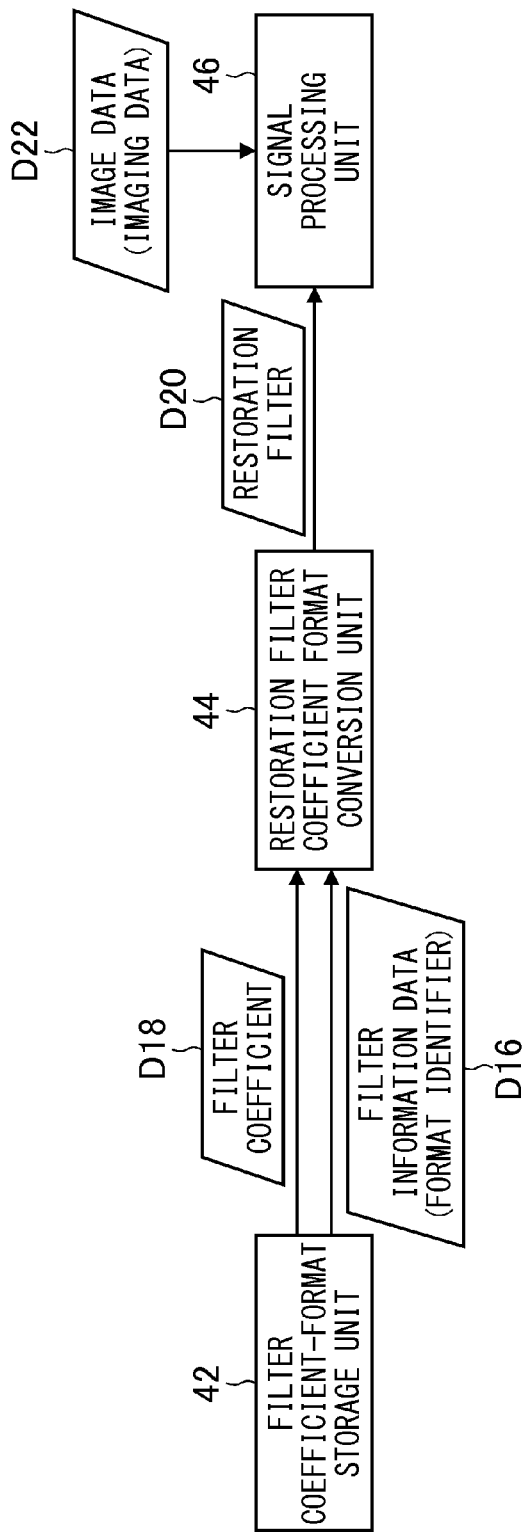
FIG. 6 is a functional block diagram illustrating a flow of preparing the restoration filter on the basis of the filter coefficient and filter information stored in a storage unit.

FIG. 6 is a functional block diagram illustrating a flow of preparing the restoration filter on the basis of the filter coefficient and the filter information stored in the storage unit.

The filter information D16 and the filter coefficient D18 stored in the filter coefficient-format storage unit 42 are read by a restoration filter coefficient format conversion unit (restoration filter preparing unit) 44.

The restoration filter coefficient format conversion unit 44 prepares a restoration filter D20 on the basis of the filter coefficient D18 and the filter information D16 stored in the filter coefficient-format storage unit 42. That is, the restoration filter coefficient format conversion unit 44 refers to information data (format identifier) of a restoration filter coefficient, and converts the stored filter coefficient to a form that can be handled by a signal processing unit (point image restoration processing unit) 46 that performs the point image restoration processing using the restoration filter (filter coefficient). Specifically, the restoration filter coefficient format conversion unit 44 extends the taps to which the filter coefficient is allocated on the basis of the symmetry of the restoration filter associated with the format identifier, and prepares the restoration filter of M taps×M taps for example. Therefore, the restoration filter coefficient format conversion unit 44 allocates 0 to surrounding taps, extends the taps of the filter coefficient in the rotation symmetry, and/or extends the allocation of the filter coefficient to all the taps. Also, the restoration filter D20 prepared in the restoration filter coefficient format conversion unit 44 can be an arbitrary form applicable to image data D22 in the signal processing unit 46 of a subsequent stage.

The restoration filter coefficient format conversion unit 44 sends the restoration filter D20 prepared in this way to the signal processing unit 46. The signal processing unit 46 receives the restoration filter (filter coefficient) from the restoration filter coefficient format conversion unit 44 and applies the restoration filter to input image data D22 so as to perform the point image restoration processing to the input image data D22.

As described above, according to the present embodiment, the symmetry of the optical information (PSF or the like) indicating the point image intensity distribution of the optical system and the like is considered first and the filter format is predetermined. Thus, while keeping the point image restoration accuracy by the restoration filter at or above a fixed level, a storage filter information amount required for the filter design can be reduced and the computational complexity can be substantially reduced. Therefore, it is possible to reduce a preservation data amount of the filter coefficient required for reproducing a complete restoration filter, and to reduce a required ROM capacity (storage capacity).

Also, in comparison with "a case of calculating M×M filter coefficients first, considering the symmetry of the filter coefficient itself, and conducting lossy compression of the filter coefficient", in the method of determining the filter coefficient according to the present embodiment, the filter coefficient of the tap of the restoration filter to be stored can be obtained by direct optimization by the frequency approximation. Thus, a more desirable restoration filter can be obtained regarding the frequency characteristic of the restoration filter.

Second Embodiment

In the present embodiment, the same signs are attached for configurations in common with the first embodiment described above, and detailed descriptions thereof are omitted.

The optical transfer function (the optical information indicating the point image intensity distribution of the optical system used when acquiring image data) stored in the PSF storage unit 36 (see FIG. 4) can be stored in an arbitrary format. Below, a case of storing the optical transfer function (PSF) in the PSF storage unit 36 in a state that redundancy based on the symmetry is eliminated will be described.

The optical information stored in the PSF storage unit 36 in the present embodiment includes the data indicating the kind of the symmetry of the point image intensity distribution based on the PSF, and the data (compressed data) of the PSF compressed so as to reproduce the point image intensity distribution on the basis of the kind of the symmetry of the point image intensity distribution. The data (compressed data) of the compressed PSF is associated with the data indicating the kind of the symmetry of the point image intensity distribution.

FIG. 7 is a table illustrating a relationship of the optical transfer functions (PSF, OTF) stored in the PSF storage unit 36 according to the second embodiment, and illustrates correspondence of the format identifier (PSF type ID), the symmetry of the PSF, presence/absence of the phase component, a domain of the PSF to be stored and an OTF domain to be stored.

In the present embodiment, for a sampling interval of discretization of the PSF and the OTF in the domain to be stored, it is needed to select an appropriate one according to each PSF type ID. The number K of sampling values of PSF information becomes smaller as the domain to be stored becomes smaller (narrower).

Also, the format identifier (filter information ID) illustrated in FIG. 5 and the format identifier (PSF type ID) illustrated in FIG. 7 correspond to each other, and a common identifier p is allocated to the corresponding format identifiers. By allocating the common identifier p to the PSF type ID (see FIG. 7) and the filter information ID (see FIG. 5) that correspond to each other, in the case where the PSF is stored in the PSF storage unit 36 in the state that the symmetry of the PSF is considered and the redundancy is eliminated, the need of a process of determining the symmetry of the restoration filter in the filter information calculating unit 38 is eliminated. The other processing in the filter information calculating unit 38 is substantially the same as the first embodiment.

The filter information calculating unit 38 obtains the data indicating the kind of the symmetry of the restoration filter from the data indicating the kind of the symmetry of the point image intensity distribution. Also, the filter information calculating unit 38 obtains the data related to the number of the taps of the restoration filter on the basis of the compressed data associated with the data indicating the kind of the symmetry of the point image intensity distribution and the restoration condition parameters (e.g. the statistical information and the SN ratio).

For calculation of a Wiener filter frequency (a desired frequency of the restoration filter), the filter coefficient calculating unit 40 develops the PSF only partially preserved in consideration of the symmetry to the entire domain (required domain) considering the symmetry, calculates the PSF condition for which the whole is completely restored, and then calculates the individual filter coefficients. Here, the PSF needs to be developed in the entire domain once because a computation formula of the Wiener filter frequency is nonlinear. However, by slightly changing a standard of restoration filter preparation as below, the computational complexity and a required memory can be substantially reduced. That is, a mean square error $J_{WNR}[x]$ of the image data (the post-point-image-restoration-processing image data) which is an application result of the restoration filter and an ideal image before degradation by a point spread phenomenon is expressed as follows.

$$J_{WNR}[x] = \int_{-\pi}^{\pi}\int_{-\pi}^{\pi} (S(\omega_x, \omega_y)\|1 - H(\omega_x, \omega_y \mid y)f_p(\omega_x, \omega_y \mid x)\|^2 + N(\omega_x, \omega_y)\|f_p(\omega_x, \omega_y \mid x)\|^2)d\omega_y d\omega_x$$

Expression 4

In the expression, individual functions are defined as follows.

$y \in \Re^K$: stored PSF (or OTF) information vector
$H(\omega_x, \omega_y | y)$: restoration function of OTF
$S(\omega_x, \omega_y) \geq 0$: mean signal power
$N(\omega_x, \omega_y) \geq 0$: mean noise power The mean square error $J_{WNR}[x]$ is an evaluation standard of a Wiener filter itself, and if $f_p$ is nonparametric, a filter frequency characteristic that minimizes the mean square error $J_{WNR}[x]$ has a relationship of $f_p(\omega_x, \omega_y)=d(\omega_x, \omega_y)$, and coincides with a convolution type ideal Wiener filter frequency.

If $H(\omega_x, \omega_y | y)$ is a linear expression regarding y, x that minimizes the evaluation standard is similar to the case of the first embodiment, and the calculation of the ideal Wiener filter frequency to be a target is not needed so that the computational complexity and a required memory amount can be reduced.

As described above, according to the present embodiment, since the optical information (e.g. PSF, OTF information) indicating the point image intensity distribution of the optical system is stored and used in the state that the redundancy by the symmetry is eliminated, it is not needed to determine the symmetry of the optical information. Also, in the case where the symmetry is considered and only a part of the optical information (PSF, OTF) is preserved, the filter can be designed without calculating the Wiener filter frequency in the middle of filter coefficient computation, and arithmetic processing loads can be reduced.

Third Embodiment

In the present embodiment, the same signs are attached for configurations in common with the first embodiment and the second embodiment, and detailed descriptions thereof are omitted.

The filter coefficient-format storage unit 42 (see FIG. 4) can store the filter coefficient D18, the filter information D16 and the PSF condition in an arbitrary format.

FIG. 8 is a functional block diagram illustrating the filter coefficient-format storage unit 42 according to the third embodiment.

The filter coefficient outputted from the filter coefficient calculating unit 40 in a format-specified and compressed form is recorded in the filter coefficient-format storage unit 42 together with the filter information (e.g. filter information ID (identifier p) and filter size data (M)). A reason for recording these pieces of information in the storage is that it is preferable to preserve the filter coefficient that is once calculated so as to be used immediately next time since it takes a calculation cost to calculate the filter coefficient. Also, even in the case of not calculating the filter coefficient in the camera body or in RAW development software installed in a personal computer, the above-described storage recording method is effective in the case of storing the filter coefficient calculated beforehand in a ROM upon shipping for example.

The filter coefficient-format storage unit 42 according to the present embodiment includes a storage processing unit 48 having a serializer 49 and a deserializer 50, and an index-offset conversion table storage unit 52 and a restoration filter information storage unit 54 connected to the storage processing unit 48.

The serializer 49 computes a filter coefficient vector (size N) from the filter information ID (identifier p), the filter size data (M) and the filter coefficient that are inputted, and records the filter information ID (identifier p), the filter size data (M) and the filter coefficient vector in the restoration filter information storage unit 54 in the minimum necessary storage size. On the other hand, the deserializer 50 performs processing opposite to the processing of the serializer 49, and restores the filter information ID (identifier p), the filter size data (M) and the filter coefficient from the "the filter information ID (identifier p), the filter size data (M) and the filter coefficient vector" read from the restoration filter information storage unit 54.

There are many restoration filters to be recorded according to the photographing condition and the position in the image, and while random access to the memory (the restoration filter information storage unit 54) becomes difficult since a data length of a storage element is not fixed, the random access to the memory is needed because under which condition photographing is to be performed is decided randomly by a user. Therefore, a contrivance of storing an index-offset conversion table in the index-offset conversion table storage unit 52 and facilitating the random access is needed.

That is, the index-offset conversion table in which the photographing condition (acquisition condition) of the image data and the position in the image indicated by the image data, and the memory address of the filter coefficient-format storage unit 42 (the restoration filter information storage unit 54) where the filter coefficient and the filter information associated with each other are stored are associated is stored in the index-offset conversion table storage unit 52. Thus, the index-offset conversion table in which the memory address (offset information) of "the filter information ID (identifier p), the filter size data (M) and the filter coefficient vector" in the restoration filter information storage unit 54 and the corresponding "photographing condition and the position in the image" (index) are associated with each other is stored in the index-offset conversion table storage unit 52 by the storage processing unit 48 (the serializer 49).

The restoration filter coefficient format conversion unit 44 reads the filter coefficient and the filter information according to the acquisition condition of the image data and the position in the image indicated by the image data from the filter coefficient-format storage unit 42 (the restoration filter information storage unit 54) on the basis of the index-offset conversion table stored in the index-offset conversion table storage unit 52. That is, when reading the required "filter information ID (identifier p), the file size data (M) and the filter coefficient vector", through the deserializer 50, the restoration filter coefficient format conversion unit 44 refers to the index-offset conversion table stored in the index-offset conversion table storage unit 52, and acquires the corresponding memory address in the restoration filter information storage unit 54 with the "corresponding photographing condition and the corresponding position in the image" (index) of the restoration filter to be required as a key. Then, by randomly accessing the acquired memory address in the restoration filter information storage unit 54 through the deserializer 50, the restoration filter coefficient format conversion unit 44 can quickly read the required "filter information ID (identifier p), the file size data (M) and the filter coefficient vector".

As described above, according to the present embodiment, the filter coefficient outputted in the format-specified and compressed form can be recorded in the storage unit (the filter coefficient-format storage unit 42) by the minimum necessary storage size. Also, since each data held in the storage unit (memory) can be randomly accessed efficiently, lowering of a read speed of the data (the filter coefficient, the filter information (identifier p, filter size M)) required for reproducing the restoration filter can be evaded.

Fourth Embodiment

In the present embodiment, the same signs are attached for configurations in common with the first embodiment, the second embodiment and the third embodiment, and detailed descriptions thereof are omitted.

Figure 9:
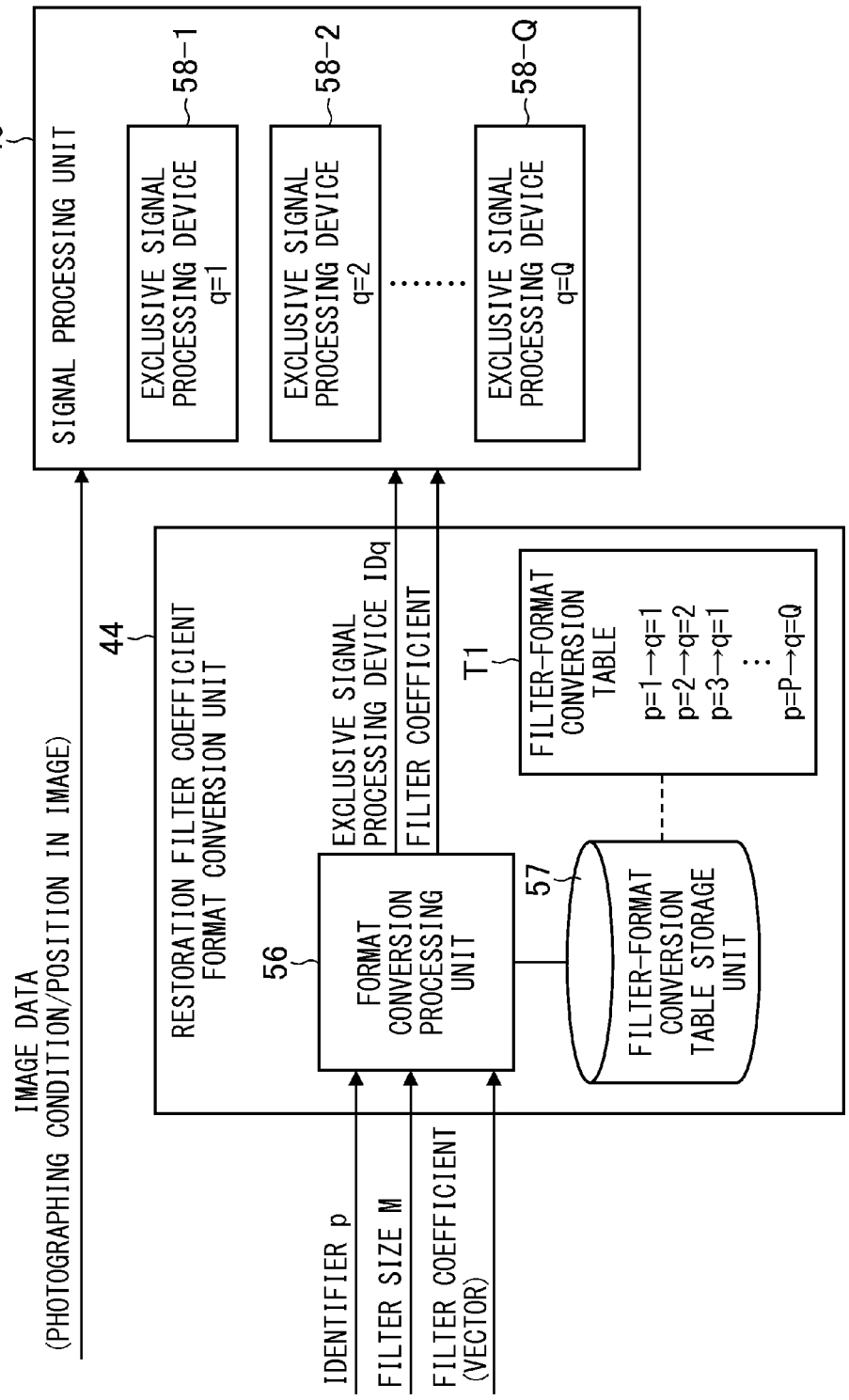
FIG. 9 is a functional block diagram illustrating a configuration of a restoration filter coefficient format conversion unit and a signal processing unit according to a fourth embodiment.

FIG. 9 is a functional block diagram illustrating a configuration of the restoration filter coefficient format conversion unit 44 and the signal processing unit 46 according to the fourth embodiment.

The restoration filter coefficient format conversion unit 44 prepares the restoration filter from the filter coefficient and the filter information (format identifier) held in the filter coefficient-format storage unit 42 (see FIG. 6), and the signal processing unit 46 performs the point image restoration processing of the image data using the prepared restoration filter.

The signal processing unit 46 of the present embodiment has a plurality of exclusive signal processing devices (restoration processing units) 58-$i$ ($i=1$ to Q; the plurality of exclusive signal processing devices are indicated simply by the sign "58" hereinafter) that perform the point image restoration processing by applying the restoration filter to the image data, and the exclusive signal processing devices 58 are prepared for the plurality of kinds of the symmetry of the restoration filter respectively.

The restoration filter coefficient format conversion unit 44 has a format conversion processing unit 56, and the format conversion processing unit 56 is provided with a filter-format conversion table storage unit 57 that stores a filter-format conversion table T1 indicating the correspondence of the kinds of the symmetry of the restoration filter and the exclusive signal processing devices 58.

On the basis of the filter-format conversion table T1, the format conversion processing unit 56 obtains the kind of the symmetry of the restoration filter from the filter information read from the filter coefficient-format storage unit 42 and specifies the corresponding exclusive signal processing device 58 (exclusive signal processing device ID (q)). Also, the format conversion processing unit 56 (extensionally) converts the filter coefficient to a form (tap format) according to the specified corresponding exclusive signal processing device 58 (exclusive signal processing device ID (q)) as needed. Also, in the case where the filter coefficient (the filter coefficient to be stored) read from the filter coefficient-format storage unit 42 can be directly inputted to the specified corresponding exclusive signal processing device 58 without performing this conversion of the filter coefficient, the filter coefficient is not converted in the format conversion processing unit 56.

"The exclusive signal processing device ID (q: processing unit indicating data) indicating the corresponding exclusive signal processing device 58" and "the filter coefficient" specified in this way are sent from the format conversion processing unit 56 to the signal processing unit 46 as the restoration filter.

The signal processing unit 46 performs the point image restoration processing to the input image data using the filter coefficient sent from the restoration filter coefficient format conversion unit 44 (the format conversion processing unit 56) by the exclusive signal processing device 58-$q$ indicated by the exclusive signal processing device ID (q) sent from the restoration filter coefficient format conversion unit 44.

While the restoration filter is applied in the signal processing unit 46 by hardware or software, in either case, when there is the constraint condition that the restoration filter is a symmetrical form or the like, the optimization of reducing the number of times of multiplication or the like can be performed.

The exclusive signal processing devices 58 are point image restoration processing devices optimized according to the symmetry of the respectively associated restoration filters, and can reduce operation loads and perform a high-speed operation by optimum arithmetic processing in consideration of the symmetry. For example, in the case where there is a signal processing device (the exclusive signal processing device 58) exclusive for each storage format (identifier p) of the restoration filter (filter coefficient), only a parameter of the corresponding exclusive signal processing device 58 is set. However, in the case where the number of patterns of the exclusive signal processing device 58 is small, format conversion is required.

For the applicable exclusive signal processing device 58, there is an inclusion relation according to the degree of freedom of the filter format (the symmetry of the restoration filter). For example, as the signal processing device for the restoration filter coefficient of the rotation symmetry, the exclusive signal processing device 58 designed exclusively for the filter coefficient of the restoration filter of the horizontal symmetry can be used. In this case, the format conversion processing unit 56 refers to the filter-format conversion table T1 stored in the filter-format conversion table storage unit 57, and converts the filter format of the restoration filter of the rotation symmetry to the filter format of the horizontal symmetry. Also, regarding the taps required for reproducing the restoration filter (see the filter coefficient arrangement format and the number (N) of the filter coefficients to be stored in FIG. 5), the format conversion processing unit 56 extends the number of the taps in the case of the restoration filter of the rotation symmetry to the number of the taps in the case of the restoration filter of the horizontal symmetry, and allocates the corresponding filter coefficients to the extended taps.

This example of performing such conversion in the case where there is no signal processing device exclusive for the rotation symmetry is preferable since the exclusive signal processing device 58 that reduces the computational complexity as much as possible in a possible range can be made to execute the point image restoration processing, though the computational complexity for the point image restoration processing becomes large in comparison with the case where there is the signal processing device exclusive for the rotation symmetry. By format-converting the filter format in this way, handling by the existing exclusive signal processing device 58 is sometimes made possible.

In order to realize this, a table (the filter-format conversion table T1) listing pairs for which format conversion is possible between the filter format identifier p ($1 \leq p \leq P$) and the filter format identifier q (the exclusive signal processing device ID (q): $1 \leq q \leq Q$) that the signal processing device can handle or determination logic is prepared, and the format conversion processing unit 56 executes conversion processing to such a format that the calculation cost is the lowest among the convertible filter format identifier q (the exclusive signal processing device ID (q)), and selects the corresponding device to perform processing. For example, when it is assumed that numbers are attached such that the computational complexity of the signal processing devices becomes (q=1)<(q=2)< . . . <(q=Q), by selecting a conversion pair having the smallest q number among the convertible "filter format identifier p-filter format identifier q" conversion pairs, the operation loads can be reduced.

As described above, according to the present embodiment, even in the case where a storage format of the restoration filter and a filter coefficient input format of the signal processing device of filter application do not coincide, the point image restoration processing can be performed by appropriately applying the restoration filter. Also, in the case where a plurality of exclusive signal processing devices can be utilized, the signal processing device of a lower calculation cost can be made to be in charge of the point image restoration processing.

Modification

The above-described digital camera 10 is just one example, and it is possible to apply the present invention to other configurations as well. Also, individual functional configurations can be appropriately realized by arbitrary hardware, software or a combination of both. Therefore, for example, the present invention can be applied even to the software (a program for making a computer execute individual processing steps (procedures) or the like) that makes a computer execute processing procedures in the individual processing units (the restoration condition parameter calculating unit 34, the PSF storage unit 36, the filter information calculating unit 38, the filter coefficient calculating unit 40, the filter coefficient-format storage unit 42, the restoration filter coefficient format conversion unit 44 and the signal processing unit 46). The software (program or the like) may be recorded in a non-transitory computer-readable medium like a ROM.

Also, in the individual embodiments described above, a mode that the camera body 14 (the camera body controller 28) includes the individual processing units (the restoration condition parameter calculating unit 34, the PSF storage unit 36, the filter information calculating unit 38, the filter coefficient calculating unit 40, the filter coefficient-format storage unit 42, the restoration filter coefficient format conversion unit 44 and the signal processing unit 46) has been described, but these processing units may be provided on an arbitrary part.

For example, the restoration condition parameter calculating unit 34 (parameter storage unit) that calculates and stores the statistical information related to the restoration of the image data, the PSF storage unit (optical information storage unit) 36 that stores the optical information (PSF, OTF or the like) indicating the point image intensity distribution of the optical system used when acquiring the image data, and the filter information calculating unit 38 (a restoration condition parameter acquiring unit, the optical information acquiring unit, and the filter information calculating unit) that acquires the statistical information and the optical information and obtains the filter information of the restoration filter for the point image restoration processing of the image data on the basis of the statistical information and the optical information may be provided in a single digital camera 10 (imaging device).

Also, the optical information (PSF or the like) indicating the point image intensity distribution of the optical system used when acquiring the image data may be stored in the lens unit controller (optical information storage unit) 20 of the lens unit 12 of the digital camera 10, the statistical information (SN ratio or the like) related to the restoration of the image data may be stored in the camera body controller 28 (parameter storage unit) of the camera body 14, and the filter information calculating unit 38 (the restoration condition parameter acquiring unit, the optical information acquiring unit, the filter information calculating unit) that obtains the filter information of the restoration filter for the point image restoration processing of the image data on the basis of the statistical information and the optical information may be provided in the camera body 14.

Also, the statistical information related to the restoration of the image data may be inputted to a computer together with the image data, and the optical information storage unit (the PSF storage unit 36) that stores the optical information indicating the point image intensity distribution of the optical system used when acquiring the image data and the filter information calculating unit 38 (the restoration condition parameter acquiring unit, the optical information acquiring unit and the filter information calculating unit) that obtains the filter information of the restoration filter for the point image restoration processing of the image data on the basis of the statistical information and the optical information may be provided in the computer.

Also, the statistical information related to the restoration of the image data and the optical information indicating the point image intensity distribution of the optical system used when acquiring the image data may be inputted to a computer together with the image data, and the filter information calculating unit 38 (the restoration condition parameter acquiring unit, the optical information acquiring unit and the filter information calculating unit) that obtains the filter information of the restoration filter for the point image restoration processing of the image data on the basis of the statistical information and the optical information may be provided in the computer.

FIG. 10 is a table illustrating a specific example (embodiment) related to installation of the individual processing units.

The above-described individual embodiments correspond to an embodiment 1 in FIG. 10 since they are examples that the individual processing units illustrated in FIG. 4 and FIG. 6 are provided in the camera body 14. The embodiment 1 is suitable for the digital camera 10 in which the lens unit 12 and the camera body 14 are integrally configured, for example.

On the other hand, in the case where the lens unit 12 of the digital camera 10 is interchangeable, it is also possible to provide the PSF storage unit 36 in the lens unit 12 (the lens unit controller 20) and provide the other processing units in the camera body 14 (the camera body controller 28) (an embodiment 2 in FIG. 10). In this case, the optical transfer function (PSF, OTF) defined for each lens unit 12 can be held in the lens unit 12. Thus, in the case of performing the point image restoration processing on the side of the camera body 14, the need of holding the optical transfer functions defined for the other lens units not to be used is eliminated, storage loads can be reduced.

Also, even in the case where the PSF storage unit 36 is provided in the camera body 14, the optical transfer functions to be stored in the PSF storage unit 36 may be stored in the server controller 84 of the server 80 beforehand, and the required optical transfer function may be downloaded (DL)/installed in the PSF storage unit 36 from the server controller 84 through the Internet 70 (network) and the computer 60 (an embodiment 3).

It is also possible to realize the individual processing units illustrated in FIG. 4 and FIG. 6 by the computer 60 (the computer controller 64). In this case, the restoration condition parameter calculating unit 34 may be realized by the camera body 14 (the camera body controller 28), the restoration condition parameter (the statistical information) calculated by the camera body controller 28 may be included in the header information of an Exif image file, and the restoration condition parameter may be transmitted from the camera body 14 to the computer 60 together with a main image (image data) (an embodiment 4). Also, the optical transfer functions to be stored in the PSF storage unit 36 may be preinstalled in the PSF storage unit 36 of the computer 60 (the computer controller 64) or may be downloaded (DL)/installed in the PSF storage unit 36 from the server controller 84 through the Internet 70 (network) as needed. Also, the restoration condition parameter calculating unit 34 may be realized by the camera body 14 (the camera body controller 28), the PSF storage unit 36 may be realized by the interchangeable lens unit 12 (the lens unit controller 20), and the other processing units may be realized by the computer 60 (the computer controller 64) (an embodiment 5).

The mode to which the present invention is applicable is not limited to the digital camera or the computer in particular, and the application is possible also to mobile devices having other functions (a call function, a communication function, and the other computer functions) apart from imaging in addition to a camera whose main function is imaging. Examples of other modes to which the present invention is applicable include, for example, a portable telephone set, a smartphone, a PDA (Personal Digital Assistants), and a portable game machine that have a camera function. Below, with a smartphone as an example, details will be described with reference to the drawings.

Configuration of Smartphone

Figure 11:
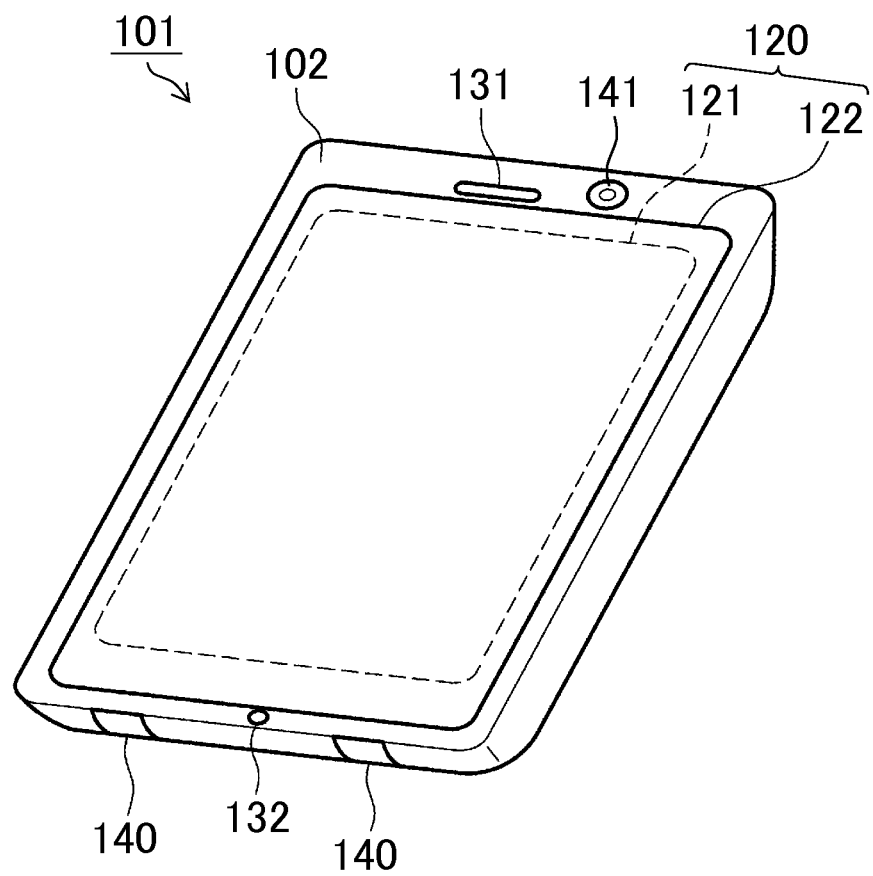
FIG. 11 is an external view of a smartphone.

FIG. 11 illustrates an external view of a smartphone 101 which is one embodiment of a photographing device of the present invention. The smartphone 101 illustrated in FIG. 11 has a planar casing 102, and a display input unit 120 for which a display panel 121 as a display unit and an operation panel 122 as an input unit are united is provided on one surface of the casing 102. Also, the casing 102 includes a speaker 131, a microphone 132, an operation unit 140, and a camera unit 141. Also, the configuration of the casing 102 is not limited to this, and for example, a configuration that the display unit and the input unit are independent may be adopted or a configuration having a folding structure or a slide mechanism may be adopted.

Figure 12:
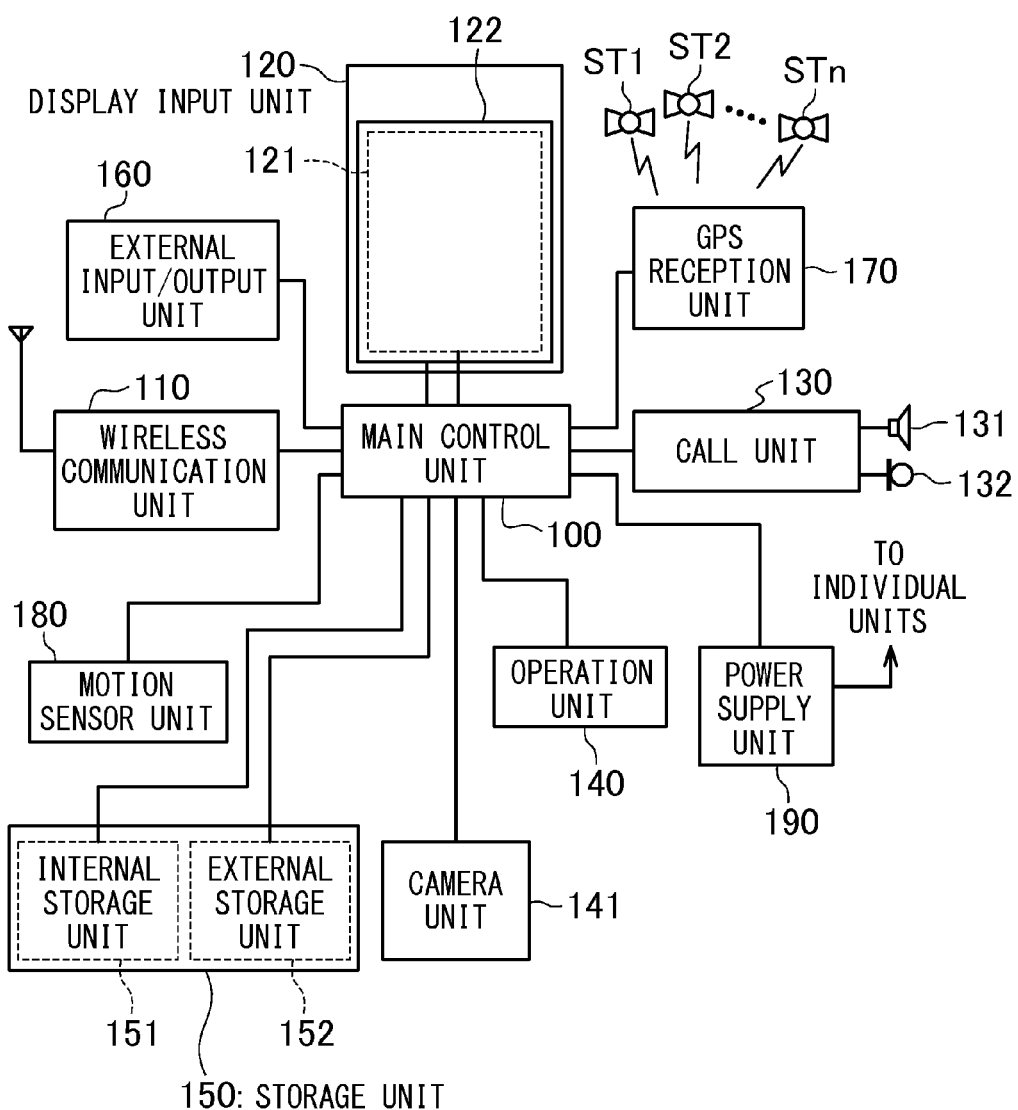
FIG. 12 is a block diagram illustrating a configuration of the smartphone illustrated in FIG. 11.

FIG. 12 is a block diagram illustrating the configuration of the smartphone 101 illustrated in FIG. 11. As illustrated in FIG. 12, as main components of the smartphone, a wireless communication unit 110, the display input unit 120, a call unit 130, the operation unit 140, the camera unit 141, a storage unit 150, an external input/output unit 160, a GPS (Global Positioning System) reception unit 170, a motion sensor unit 180, a power supply unit 190, and a main control unit 100 are provided. Also, as a main function of the smartphone 101, a wireless communication function of performing mobile wireless communication through a base station device and a mobile communication network is provided.

The wireless communication unit 110 performs wireless communication to the base station device housed in the mobile communication network according to an instruction of the main control unit 100. Using the wireless communication, various kinds of file data such as sound data and image data and electronic mail data or the like are transmitted and received, and Web data and streaming data or the like are received.

The display input unit 120 is a so-called touch panel that visually transmits information to a user by displaying images (still images and moving images) and character information or the like and detects a user operation to the display information by control of the main control unit 100, and includes the display panel 121 and the operation panel 122.

For the display panel 121, an LCD (Liquid Crystal Display), an OELD (Organic Electro-Luminescence Display) or the like is used as a display device. The operation panel 122 is a device that is mounted so that the image displayed on a display surface of the display panel 121 can be visually recognized, and detects one or a plurality of coordinates operated with a finger of a user or a stylus. When the device is operated with a finger of a user or a stylus, a detection signal generated due to the operation is outputted to the main control unit 100. Then, the main control unit 100 detects an operation position (coordinates) on the display panel 121 on the basis of the received detection signal.

As illustrated in FIG. 11, the display panel 121 and the operation panel 122 of the smartphone 101 illustrated as one embodiment of the photographing device of the present invention are united to configure the display input unit 120, and the operation panel 122 is arranged so as to completely cover the display panel 121. In the case of adopting the arrangement, the operation panel 122 may have a function of detecting a user operation even for an area other than the display panel 121. In other words, the operation panel 122 may have a detection area (called a display area, hereinafter) for a superimposed part superimposed on the display panel 121, and the other detection area (called a non-display area, hereinafter) for an outer edge part not superimposed on the display panel 121.

Also, a size of the display area and a size of the display panel 121 may be completely matched but it is not needed to surely match both. Also, the operation panel 122 may have two sensitive areas of the outer edge part and the other inner side part. Further, a width of the outer edge part is appropriately designed according to the size of the casing 102 or the like. Furthermore, examples of a position detection system adopted in the operation panel 122 are a matrix switch system, a resistive film system, a surface acoustic wave system, an infrared ray system, an electromagnetic induction system, a capacitance system, or the like, and any system can be adopted.

The call unit 130 includes the speaker 131 and the microphone 132, converts voice of a user inputted through the microphone 132 to the sound data that can be processed in the main control unit 100, outputs it to the main control unit 100, decodes the sound data received by the wireless communication unit 110 or the external input/output unit 160 to the sound data and outputs it from the speaker 131. Also, as illustrated in FIG. 11, for example, the speaker 131 may be loaded on the same surface as a surface provided with the display input unit 120, and the microphone 132 may be loaded on a side face of the casing 102.

The operation unit 140 is a hardware key using a key switch or the like, and receives an instruction from a user. For example, as illustrated in FIG. 11, the operation unit 140 is a push button type switch that is loaded on the side face of the casing 102 of the smartphone 101 to be turned on when depressed with a finger or the like and turned to an off state by restoration force of a spring or the like when the finger is released.

The storage unit 150 stores a control program and control data of the main control unit 100, application software, address data for which a name or a telephone number or the like of a communicating party is associated, data of transmitted and received electronic mail, Web data downloaded by Web browsing, and downloaded contents data, and temporarily stores streaming data or the like. Also, the storage unit 150 is configured by an internal storage unit 151 built in the smartphone and an external storage unit 152 having a freely attachable and detachable external memory slot. Also, the respective internal storage unit 151 and external storage unit 152 configuring the storage unit 150 are realized using a storage medium such as a memory (for example, a MicroSD (registered trademark) memory or the like) of a flash memory type, a hard disk type, a multimedia card micro type, or a card type, a RAM (Random Access Memory), a ROM (Read Only Memory), or the like.

The external input/output unit 160 achieves a role of an interface with all external devices connected to the smartphone 101, and is to be directly or indirectly connected to the other external device by communication or the like (for example, a universal serial bus (USB), IEEE1394 or the like) or a network (for example, the Internet, a wireless LAN, Bluetooth (registered trademark), RFID (Radio Frequency Identification), infrared communication (Infrared Data Association: IrDA) (registered trademark), UWB (Ultra Wideband) (registered trademark), ZigBee (registered trademark), or the like).

Examples of the external device to be connected to the smartphone 101 are a wired/wireless headset, a wired/wireless external charger, a wired/wireless data port, a memory card or a SIM (Subscriber Identity Module Card)/UIM (User Identity Module Card) card connected through a card socket, an external audio/video device connected through an audio/video I/O (Input/Output) terminal, a wirelessly connected external audio/video device, a wired/wirelessly-connected smartphone, a wired/wirelessly-connected personal computer, a wired/wirelessly-connected PDA, and a wired/wirelessly-connected earphone and the like. The external input/output unit can transmit the data transmitted from such external devices to the individual components inside the smartphone 101 and transmit the data inside the smartphone 101 to the external devices.

The GPS reception unit 170, according to the instruction of main control unit 100, receives GPS signals transmitted from GPS satellites ST1-STn, executes positioning operation processing based on the plurality of received GPS signals, and detects a position composed of a latitude, a longitude and an altitude of the smartphone 101. When position information can be acquired from the wireless communication unit 110 or the external input/output unit 160 (for example, the wireless LAN), the GPS reception unit 170 can also detect the position using the position information.

The motion sensor unit 180, for example, includes a triaxial acceleration sensor or the like, and detects a physical motion of the smartphone 101 according to the instruction of the main control unit 100. By detecting the physical motion of the smartphone 101, a moving direction and acceleration of the smartphone 101 are detected. The detected results are outputted to the main control unit 100.

The power supply unit 190 supplies power stored in a battery (not shown in the figure) to the individual units of the smartphone 101 according to the instruction of the main control unit 100.

The main control unit 100 includes a microprocessor, is operated according to the control program and the control data stored by the storage unit 150, and generally controls the individual units of the smartphone 101. Also, the main control unit 100 has a mobile communication control function of controlling the individual units of a communication system in order to perform sound communication and data communication through the wireless communication unit 110, and an application processing function.

The application processing function is realized by the operation of the main control unit 100 according to the application software stored by the storage unit 150. Examples of the application processing function are an infrared communication function of performing data communication with an opposite device by controlling the external input/output unit 160, an electronic mail function of transmitting and receiving electronic mail, and a Web browsing function of browsing a Web page, or the like.

Also, the main control unit 100 has an image processing function of displaying video images at the display input unit 120 or the like on the basis of the image data (data of still images and moving images) of received data and downloaded streaming data or the like. The image processing function is a function that the main control unit 100 decodes the image data, executes image processing to the decoded result and displays the image at the display input unit 120.

Further, the main control unit 100 executes display control to the display panel 121, and operation detection control of detecting a user operation through the operation unit 140 and the operation panel 122.

By executing the display control, the main control unit 100 displays an icon for activating the application software and a software key such as a scroll bar, or displays a window for preparing electronic mail. Also, the scroll bar is the software key for receiving an instruction of moving a display part of an image for a large image that cannot be settled in the display area of the display panel 121 or the like.

Also, by executing the operation detection control, the main control unit 100 detects the user operation through the operation unit 140, receives an operation to the icon and input of a character string to an input column of the window through the operation panel 122, or receives a request to scroll a display image through the scroll bar.

Further, by executing the operation detection control, the main control unit 100 has a touch panel control function of determining whether an operation position to the operation panel 122 is the superimposed part (display area) superimposed on the display panel 121 or the other outer edge part (non-display area) not superimposed on the display panel 121, and controlling the sensitive area of the operation panel 122 and a display position of the software key.

Also, the main control unit 100 can detect a gesture operation to the operation panel 122 and execute a function set beforehand according to the detected gesture operation. The gesture operation is not a conventional simple touch operation, and means an operation of drawing a track with a finger or the like, simultaneously specifying a plurality of positions, or combining them and drawing a track for at least one from the plurality of positions.

The camera unit 141 is a digital camera that performs electronic photographing using an imaging element such as a CMOS (Complementary Metal Oxide Semiconductor) or a CCD (Charge-Coupled Device). Also, the camera unit 141 can, by control of the main control unit 100, convert image data obtained by imaging to compressed image data of JPEG (Joint Photographic coding Experts Group) or the like for instance, record it in the storage unit 150, and output it through the input/output unit 160 or the wireless communication unit 110. In the smartphone 101 illustrated in FIG. 11, the camera unit 141 is loaded on the same surface as the display input unit 120, however, a loading position of the camera unit 141 is not limited to this, and it may be loaded on a back surface of the display input unit 120, or the plurality of camera units 141 may be loaded. Also, in the case where the plurality of camera units 141 are loaded, the camera unit 141 to be used for photographing may be switched to perform photographing alone, or the plurality of camera units 141 may be used simultaneously to perform photographing.

Also, the camera unit 141 can be utilized for the various kinds of functions of the smartphone 101. For example, the image acquired in the camera unit 141 can be displayed on the display panel 121, and the image of the camera unit 141 can be utilized as one of operation input of the operation panel 122. Also, when the GPS reception unit 170 detects a position, the position can be detected by referring to the image from the camera unit 141. Further, by referring to the image from the camera unit 141, without using the triaxial acceleration sensor or in combined use with the triaxial acceleration sensor, an optical axis direction of the camera unit 141 of the smartphone 101 can be determined and a current using environment can be determined Of course, the image from the camera unit 141 can be utilized within the application software as well.

In addition, the position information acquired by the GPS reception unit 170, sound information (may be text information by performing sound text conversion by the main control unit or the like) acquired by the microphone 132, posture information acquired by the motion sensor unit 180, or the like can be added to the image data of the still image or the moving image, and recorded in the storage unit 150 or outputted through the input/output unit 160 or the wireless communication unit 110.

In the smartphone 101, the individual processing units related to the point image restoration processing can be appropriately realized by the main control unit 100 and the storage unit 150 or the like for example.

Application Example to EDoF System

Restoration processing in the embodiments is image processing of restoring an original subject image by restoring and correcting the point spread (point image blur) according to specified photographing conditions (for example, a diaphragm value, an F value, a focus distance, a lens kind, or the like), but image restoration processing to which the present invention is applicable is not limited to the restoration processing in the embodiments. For example, even to restoration processing to image data photographed and acquired by an optical system (a photographing lens or the like) having an extended depth of field (focus) (EDoF: Extended Depth of Field (Focus)), the restoration processing according to the present invention can be applied. By performing the restoration processing to the image data of a blur image photographed and acquired in the state that the depth of field (depth of focus) is extended by the EDoF optical system, the image data of a high resolution in the state of being focused in a wide range can be restored and generated. In this case, the restoration processing using the restoration filter based on the point spread function (PSF, OTF, MTF, PTF, or the like) of the EDoF optical system, which is the restoration filter having the filter coefficient set so that excellent image restoration is possible within a range of the extended depth of field (depth of focus), is performed.

Below, one example of a system (EDoF system) related to restoration of image data photographed and acquired through the EDoF optical system will be described. Also, in the example illustrated below, an example of performing the restoration processing to a luminance signal (Y data) obtained from image data (RGB data) after demosaic processing will be described, however, timing of performing the restoration processing is not limited in particular, and the restoration processing may be performed to "image data (mosaic image data) before the demosaic processing" or "image data (demosaic image data) after the demosaic processing and before luminance signal conversion processing" for example.

Figure 13:
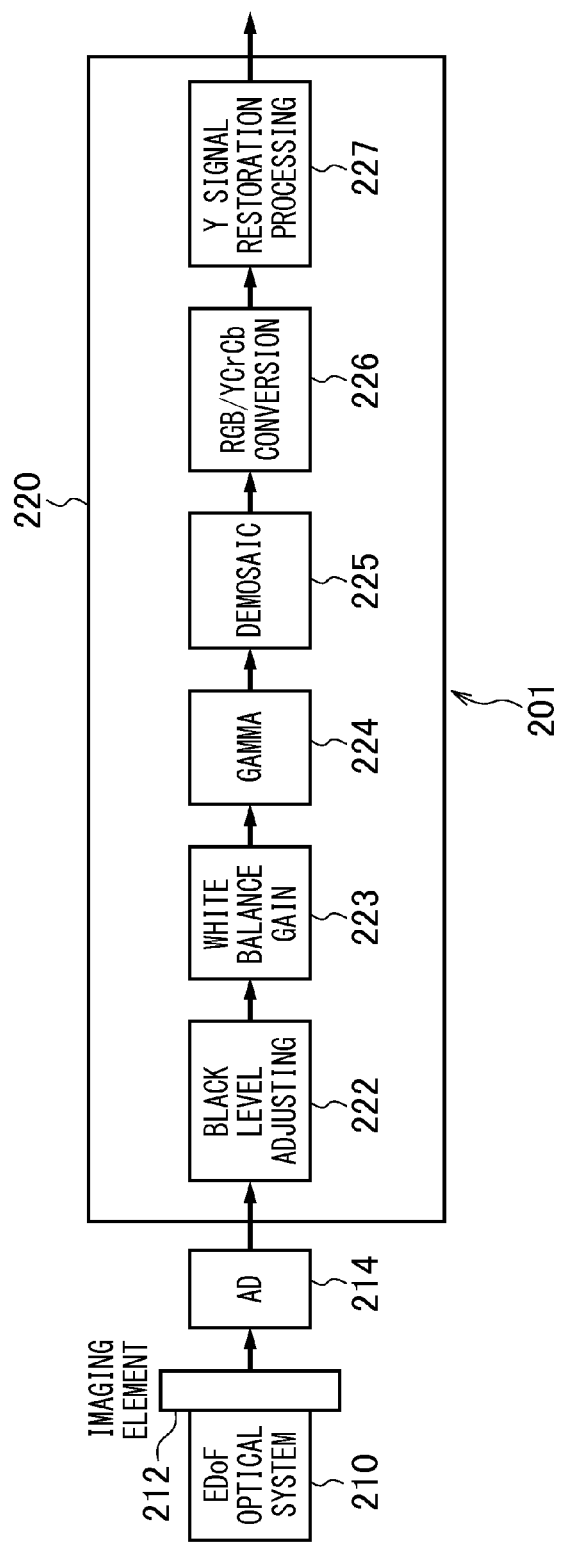
FIG. 13 is a block diagram illustrating one form of an imaging module including an EDoF optical system.

FIG. 13 is a block diagram illustrating one form of an imaging module 201 including the EDoF optical system. The imaging module (digital camera or the like) 201 of this example includes an EDoF optical system (lens unit) 210, an imaging element 212, an AD conversion unit 214, and a restoration processing block (image processing unit) 220.

Figure 14:
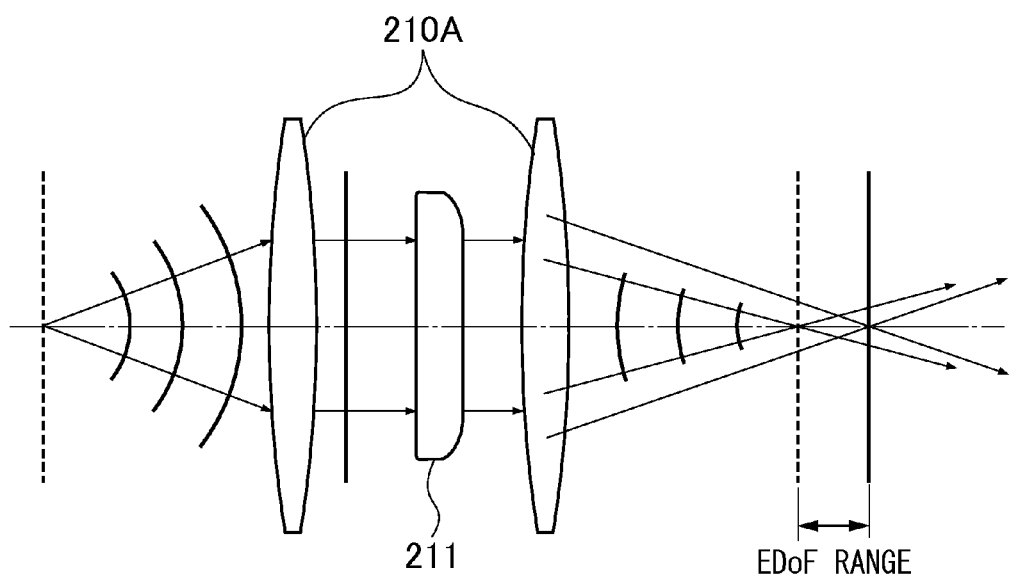
FIG. 14 is a diagram illustrating one example of the EDoF optical system.

FIG. 14 is a diagram illustrating one example of the EDoF optical system 210. The EDoF optical system 210 of this example has a single-focus fixed photographing lens 210A, and an optical filter 211 arranged at a pupil position. The optical filter 211 modulates a phase, and turns the EDoF optical system 210 (the photographing lens 210A) to EDoF so as to obtain the extended depth of field (depth of focus) (EDoF). In this way, the photographing lens 210A and the optical filter 211 configure a lens unit that modulates the phase and extends the depth of field.

Also, the EDoF optical system 210 includes other components as needed, and for example, a diaphragm (omitted in the figure) is disposed near the optical filter 211. Also, the optical filter 211 may be one sheet or a combination of a plurality of sheets. Also, the optical filter 211 is just one example of optical phase modulation means, and turning the EDoF optical system 210 (the photographing lens 210A) to the EDoF may be realized by other means. For example, instead of providing the optical filter 211, turning the EDoF optical system 210 to the EDoF may be realized by the photographing lens 210A lens-designed so as to have a function equal to the optical filter 211 of this example.

That is, turning the EDoF optical system 210 to the EDoF can be realized by various kinds of means that change a wave front of image forming to a light receiving surface of the imaging element 212. For example, "an optical element for which a thickness changes", "an optical element (a refractive index distribution type wave front modulation lens or the like) for which a refractive index changes", "an optical element (a wave front modulation hybrid lens, an optical element formed as a phase surface on a lens surface, or the like) for which the thickness and the refractive index change by coding to a lens surface or the like", or "a liquid crystal element (a liquid crystal space phase modulation element or the like) capable of modulating a phase distribution of light" may be adopted as means of turning the EDoF optical system 210 to the EDoF. In this way, the present invention is applicable not only to a case that regularly distributed image formation is possible by an optical wave front modulation element (the optical filter 211 (phase plate)) but also to a case that distributed images similar to the case of using the optical wave front modulation element can be formed by the photographing lens 210A itself without using the optical wave front modulation element.

The EDoF optical system 210 illustrated in FIG. 14 can be miniaturized since a focus adjusting mechanism that mechanically adjusts a focus can be omitted, and can be suitably loaded on a cellular phone with a camera or a portable information terminal.

An optical image after passing through the EDoF optical system 210 turned to the EDoF is image-formed by the imaging element 212 illustrated in FIG. 13 and converted to an electric signal here.

The imaging element 212 is configured by a plurality of pixels arranged in a matrix shape by a prescribed pattern array (Bayer array, G stripe R/G completely checkered pattern, X-Trans array, honeycomb array, or the like), and each pixel includes a microlens, a color filter (an RGB color filter in this example) and a photodiode. The optical image made incident on the light receiving surface of the imaging element 212 through the EDoF optical system 210 is converted to signal charges of an amount according to an incident light quantity by the individual photodiodes arrayed on the light receiving surface. Then, R, G and B signal charges stored in the individual photodiodes are successively outputted as voltage signals (image signals) of the respective pixels.

The AD conversion unit 214 converts analog R, G and B image signals outputted for the respective pixels from the imaging element 212 to digital RGB image signals. The digital image signals converted to the digital image signals by the AD conversion unit 214 are added to a restoration processing block 220.

The restoration processing block 220 includes, for example, a black level adjusting unit 222, a white balance gain unit 223, a gamma processing unit 224, a demosaic processing unit 225, an RGB/YCrCb conversion unit 226, and a Y signal restoration processing unit 227.

The black level adjusting unit 222 executes black level adjustment to the digital image signals outputted from the AD conversion unit 214. For the black level adjustment, a known method may be adopted. For example, in the case of paying attention to a certain effective photoelectric conversion element, by obtaining an average of signals for dark current amount acquisition corresponding to each of a plurality of OB photoelectric conversion elements included in a photoelectric conversion element row including the effective photoelectric conversion element, and subtracting the average from the signals for the dark current amount acquisition corresponding to the effective photoelectric conversion element, a black level is adjusted.

The white balance gain unit 223 performs gain adjustment according to a white balance gain of the individual RGB chrominance signals included in the digital image signals for which black level data is adjusted.

The gamma processing unit 224 performs gamma correction of correcting a gradation of a halftone or the like so as to turn the white-balance-adjusted R, G and B image signals to a desired gamma characteristic.

The demosaic processing unit 225 executes demosaic processing to the R, G and B image signals after the gamma correction. Specifically, the demosaic processing unit 225 generates a set of image signals (R signal, G signal, B signal) to be outputted from individual light receiving pixels of the imaging element 212 by executing color interpolation processing to the R, G and B image signals. That is, while pixel signals from the individual light receiving pixels are one of the R, G and B image signals before color demosaic processing, the set of three pixel signals that are R, G and B signals corresponding to the individual light receiving pixels is outputted after the color demosaic processing.

The RGB/YCrCb conversion unit 226 converts the demosaic-processed R, G and B signals of the respective pixels to a luminance signal Y and color difference signals Cr and Cb, and outputs the luminance signal Y and the color difference signals Cr and Cb of the respective pixels.

The Y signal restoration processing unit 227 performs the restoration processing to the luminance signal Y from the RGB/YCrCb conversion unit 226 on the basis of the restoration filter stored beforehand. The restoration filter is formed of, for example, a deconvolution kernel (corresponding to the number of taps of M=7 and N=7) having a 7×7 kernel size and an operation coefficient (corresponding to restoration gain data, the filter coefficient) corresponding to the deconvolution kernel), and is used for deconvolution processing for phase modulation of the optical filter 211. Also, for the restoration filter, the one corresponding to the optical filter 211 is stored in a memory (a memory where the Y signal restoration processing unit 227 is incidentally provided for example) not shown in the figure. Also, the kernel size of the deconvolution kernel is not limited to the one of 7×7.

Figure 15:
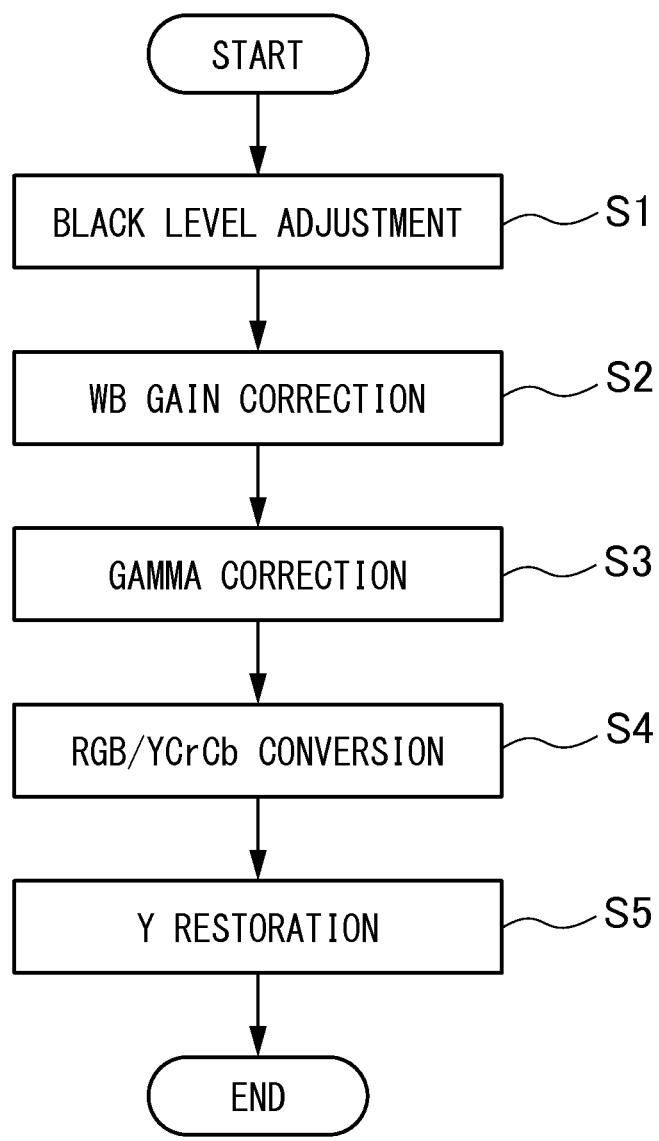
FIG. 15 is a flowchart illustrating one example of restoration processing in a restoration processing block illustrated in FIG. 13.

Next, the restoration processing by the restoration processing block 220 will be described. FIG. 15 is a flowchart illustrating one example of the restoration processing in the restoration processing block 220 illustrated in FIG. 13.

The digital image signals are added from the AD conversion unit 214 to one input of the black level adjusting unit 222, the black level data is added to the other input, and the black level adjusting unit 222 subtracts the black level data from the digital image signals and outputs the digital image signals from which the black level data is subtracted to the white balance gain unit 223 (step S1). Thus, black level components are not included in the digital image signals, and the digital image signal indicating a black level becomes 0.

To the image data after the black level adjustment, processing by the white balance gain unit 223 and the gamma processing unit 224 is successively executed (steps S2 and S3).

The gamma-corrected R, G and B signals are demosaic-processed in the demosaic processing unit 225, and then converted to the luminance signal Y and chroma signals Cr and Cb in the RGB/YCrCb conversion unit 226 (step S4).

The Y signal restoration processing unit 227 performs the restoration processing of applying the deconvolution processing for phase modulation of the optical filter 211 of the EDoF optical system 210 to the luminance signal Y (step S5). That is, the Y signal restoration processing unit 227 performs the deconvolution processing of the luminance signals (the luminance signals of 7×7 pixels here) corresponding to a pixel group of a prescribed unit with an arbitrary processing target pixel as the center and the restoration filter (the 7×7 deconvolution kernel and the operation coefficient thereof) stored beforehand in the memory or the like. The Y signal restoration processing unit 227 performs the restoration processing of removing an image blur of the entire image by repeating the deconvolution processing for each pixel group of the prescribed unit so as to cover the entire area of an imaging surface. The restoration filter is determined according to a position of the center of the pixel group to execute the deconvolution processing. That is, to adjacent pixel groups, the common restoration filter is applied. In order to simplify the restoration processing further, it is preferable to apply the common restoration filter to all the pixel groups.

Figure 16:
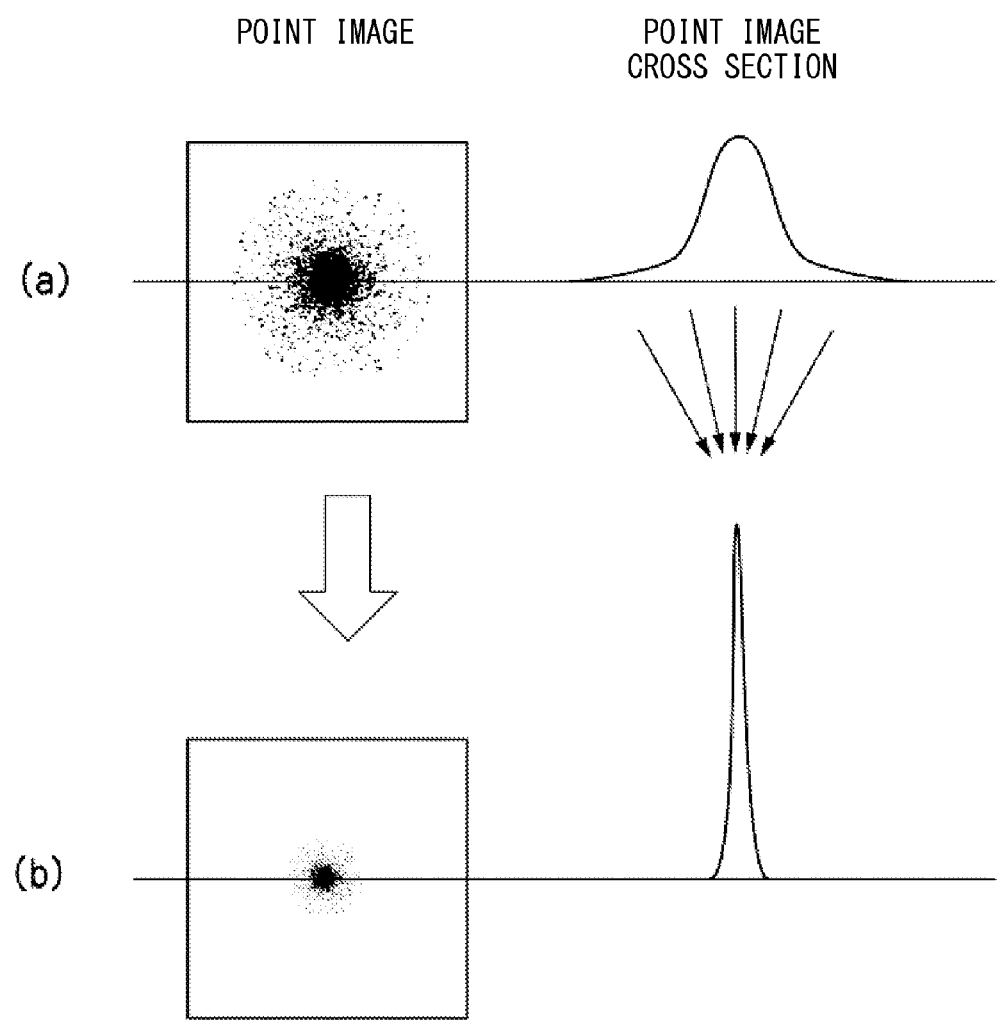
FIG. 16 is a diagram illustrating a restoration example of an image acquired through the EDoF optical system, in which the (a) part illustrates a blur image before restoration processing, and the (b) part illustrates an image (point image) for which a blur is dissolved after the restoration processing.

As illustrated in (a) part of FIG. 16, a point image (optical image) of the luminance signals after passing through the EDoF optical system 210 is image-formed by the imaging element 212 as a large point image (blur image), but is restored to a small point image (high resolution image) as illustrated in (b) part of FIG. 16 by the deconvolution processing in the Y signal restoration processing unit 227.

By applying the restoration processing to the luminance signals after the demosaic processing as described above, the need of having a parameter of the restoration processing separately for R, G and B is eliminated, and the restoration processing can be accelerated. Also, without gathering the R, G and B image signals corresponding to the R, G and B pixels at scattered positions into one unit respectively to perform the deconvolution processing, the luminance signals of adjacent pixels are gathered into the prescribed unit, the common restoration filter is applied to the unit and the deconvolution processing is performed, so that the accuracy of the restoration processing is improved. Also, from the viewpoint of a characteristic of vision by human eyes, the color difference signals Cr and Cb are allowed in terms of image quality without increasing a resolution by the restoration processing. Also, in the case of recording the image by a compression form like JPEG, since the color difference signals are compressed by higher compressibility than the luminance signals, the need of increasing the resolution by the restoration processing is little. In this way, the restoration accuracy can be improved and the processing can be simplified and accelerated compatibly.

Even to the restoration of the EDoF system described above, the point image restoration processing according to the individual embodiments of the present invention can be applied. That is, it is possible to acquire the optical information indicating the point image intensity distribution of the EDoF optical system 210 used when acquiring the image and calculate the filter coefficient of the restoration filter on the basis of the optical information in the filter information calculating unit 38 (the optical information acquiring unit) and to perform the point image restoration processing using the calculated filter coefficient in the signal processing unit 46.

It is needless to say that the present invention is not limited by the embodiments described above and various modifications can be made without departing from the scope of the present invention.

What is claimed is:
1. An image processing device comprising:
a statistical information acquiring processor that acquires statistical information related to point image restoration of an image;

an optical information acquiring processor that acquires optical information indicating a point image intensity distribution of an optical system used when the image is acquired, the optical information including: information indicating a kind of symmetry of the point image intensity distribution; and compressed information capable of reproducing the point image intensity distribution according to the kind of the symmetry of the point image intensity distribution and being associated with the information indicating the kind of the symmetry of the point image intensity distribution;

a filter information calculating processor that obtains filter information of a restoration filter for point image restoration processing of the image according to the optical information alone or in combination with the statistical information, the filter information including information related to number of taps of the restoration filter and information indicating a kind of symmetry of the restoration filter, the filter information calculating unit obtaining the information indicating the kind of the symmetry of the restoration filter from the information indicating the kind of the symmetry of the point image intensity distribution and obtaining the information related to the number of the taps of the restoration filter according to the statistical information and the compressed information associated with the information indicating the kind of the symmetry of the point image intensity distribution; and a filter coefficient calculating processor that calculates a filter coefficient of the restoration filter according to the optical information alone or in combination with the statistical information with at least the information related to the number of the taps of the restoration filter and the information indicating the kind of the symmetry of the restoration filter of the filter information as a constraint condition.

2. An image processing device comprising:

a statistical information acquiring processor that acquires statistical information related to point image restoration of an image;

an optical information acquiring processor that acquires optical information indicating a point image intensity distribution of an optical system used when the image is acquired, and information indicating a kind of symmetry of a restoration filter for point image restoration processing of the image, the restoration filter being associated with the point image intensity distribution;

a filter information calculating processor that obtains filter information of the restoration filter including information related to number of taps of the restoration filter according to the optical information alone or in combination with the statistical information; and a filter coefficient calculating processor that calculates a filter coefficient of the restoration filter according to the optical information alone or in combination with the statistical information with the information related to the number of the taps of the restoration filter and the information indicating the kind of the symmetry of the restoration filter as a constraint condition.

3. The image processing device as defined in claim 1, further comprising a storage unit that stores the filter coefficient and the filter information corresponding to the filter coefficient in association with each other.

4. The image processing device as defined in claim 2, further comprising a storage unit that stores the filter coefficient and the filter information corresponding to the filter coefficient in association with each other.

5. The image processing device as defined in claim 3, further comprising a restoration filter preparing processor that prepares the restoration filter according to the filter coefficient and the filter information stored in the storage unit.

6. The image processing device as defined in claim 4, further comprising a restoration filter preparing processor that prepares the restoration filter according to the filter coefficient and the filter information stored in the storage unit.

7. The image processing device as defined in claim 1, wherein the optical system includes a lens unit that modulates a phase to extend a depth of field.

8. The image processing device as defined in claim 2, wherein the optical system includes a lens unit that modulates a phase to extend a depth of field.

9. The image processing device as defined in claim 1, further comprising a point image restoration processing processor that performs the point image restoration processing using the filter coefficient calculated by the filter coefficient calculating processor.

10. The image processing device as defined in claim 2, further comprising a point image restoration processing processor that performs the point image restoration processing using the filter coefficient calculated by the filter coefficient calculating processor.

11. An imaging device comprising:

a statistical information storage unit that stores statistical information related to point image restoration of an image;

an optical information storage unit that stores optical information indicating a point image intensity distribution of an optical system used when the image is acquired; and the image processing device as defined in claim 1 that is connected to the statistical information storage unit and the optical information storage unit.

12. An imaging device comprising:

a statistical information storage unit that stores statistical information related to point image restoration of an image;

an optical information storage unit that stores optical information indicating a point image intensity distribution of an optical system used when the image is acquired; and the image processing device as defined in claim 2 that is connected to the statistical information storage unit and the optical information storage unit.

13. An imaging device comprising:

a lens unit; and a body unit connected to the lens unit, wherein:

the lens unit includes an optical information storage unit that stores optical information indicating a point image intensity distribution of an optical system used when an image is acquired, and the body unit includes a statistical information storage unit that stores statistical information related to point image restoration of the image, and the image processing device as defined in claim 1 that is connected to the statistical information storage unit and the optical information storage unit.

14. An imaging device comprising:
a lens unit; and
a body unit connected to the lens unit, wherein:
the lens unit includes an optical information storage unit that stores optical information indicating a point image intensity distribution of an optical system used when an image is acquired, and
the body unit includes a statistical information storage unit that stores statistical information related to point image restoration of the image, and the image processing device as defined in claim 2 that is connected to the statistical information storage unit and the optical information storage unit.

15. A computer to which statistical information related to point image restoration of an image is inputted together with the image, comprising:
an optical information storage unit that stores optical information indicating a point image intensity distribution of an optical system used when the image is acquired; and
the image processing device as defined in claim 1 that is connected to the optical information storage unit.

16. A computer to which statistical information related to point image restoration of an image is inputted together with the image, comprising:
an optical information storage unit that stores optical information indicating a point image intensity distribution of an optical system used when the image is acquired; and
the image processing device as defined in claim 2 that is connected to the optical information storage unit.

17. A computer to which statistical information related to point image restoration of an image and optical information indicating a point image intensity distribution of an optical system used when the image is acquired are inputted together with the image, comprising the image processing device as defined in claim 1.

18. A computer to which statistical information related to point image restoration of an image and optical information indicating a point image intensity distribution of an optical system used when the image is acquired are inputted together with the image, comprising the image processing device as defined in claim 2.

19. An image processing method comprising the steps of:
acquiring statistical information related to point image restoration of an image;
acquiring optical information indicating a point image intensity distribution of an optical system used when the image is acquired, the optical information including: information indicating a kind of symmetry of the point image intensity distribution; and compressed information capable of reproducing the point image intensity distribution according to the kind of the symmetry of the point image intensity distribution and being associated with the information indicating the kind of the symmetry of the point image intensity distribution;
obtaining filter information of a restoration filter for point image restoration processing of the image according to the optical information alone or in combination with the statistical information, the filter information including information related to number of taps of the restoration filter and information indicating a kind of symmetry of the restoration filter, the information indicating the kind of the symmetry of the restoration filter being obtained from the information indicating the kind of the symmetry of the point image intensity distribution, the information related to the number of the taps of the restoration filter being obtained according to the statistical information and the compressed information associated with the information indicating the kind of the symmetry of the point image intensity distribution; and
calculating a filter coefficient of the restoration filter according to the optical information alone or in combination with the statistical information with at least the information related to the number of the taps of the restoration filter and the information indicating the kind of the symmetry of the restoration filter of the filter information as a constraint condition.

20. An image processing method comprising the steps of:
acquiring statistical information related to point image restoration of an image;
acquiring optical information indicating a point image intensity distribution of an optical system used when the image is acquired, and information indicating a kind of symmetry of a restoration filter for point image restoration processing of the image, the restoration filter being associated with the point image intensity distribution;
obtaining filter information of the restoration filter including information related to number of taps of the restoration filter according to the optical information alone or in combination with the statistical information; and
calculating a filter coefficient of the restoration filter according to the optical information alone or in combination with the statistical information with at least the information related to the number of the taps of the restoration filter and the information indicating the kind of the symmetry of the restoration filter as a constraint condition.

21. A computer readable non-transitory medium storing instructions causing a computer to perform an image processing method comprising the steps of:
acquiring statistical information related to point image restoration of an image;
acquiring optical information indicating a point image intensity distribution of an optical system used when the image is acquired, the optical information including: information indicating a kind of symmetry of the point image intensity distribution; and compressed information capable of reproducing the point image intensity distribution according to the kind of the symmetry of the point image intensity distribution and being associated with the information indicating the kind of the symmetry of the point image intensity distribution;
obtaining filter information of a restoration filter for point image restoration processing of the image according to the optical information alone or in combination with the statistical information, the filter information including information related to number of taps of the restoration filter and information indicating a kind of symmetry of the restoration filter, the information indicating the kind of the symmetry of the restoration filter being obtained from the information indicating the kind of the symmetry of the point image intensity distribution, the information related to the number of the taps of the restoration filter being obtained according to the statistical information and the compressed information associated with the information indicating the kind of the symmetry of the point image intensity distribution; and calculating a filter coefficient of the restoration filter according to the optical information alone or in combination with the statistical information with at least the information related to the number of the taps of the restoration filter and the information indicating the kind of the symmetry of the restoration filter of the filter information as a constraint condition.

22. A computer readable non-transitory medium storing instructions causing a computer to perform an image processing method comprising the steps of:
   acquiring statistical information related to point image restoration of an image;
   acquiring optical information indicating a point image intensity distribution of an optical system used when the image is acquired, and information indicating a kind of symmetry of a restoration filter for point image restoration processing of the image, the restoration filter being associated with the point image intensity distribution;
   obtaining filter information of the restoration filter including information related to number of taps of the restoration filter according to the optical information alone or in combination with the statistical information; and
   calculating a filter coefficient of the restoration filter according to the optical information alone or in combination with the statistical information with at least the information related to the number of the taps of the restoration filter and the information indicating the kind of the symmetry of the restoration filter as a constraint condition.

* * * * *